United States Patent [19]

Ohsuga et al.

[11] Patent Number: 5,369,581
[45] Date of Patent: Nov. 29, 1994

[54] VEHICLE CONTROL APPARATUS AND METHOD THEREFOR

[75] Inventors: Minoru Ohsuga; Yoshishige Ohyama, both of Katsuta; Hiroshi Kuroiwa, Hitachi; Toshiharu Nogi, Katsuta; Toshimichi Minowa, Tokai; Hiroshi Kimura, Hitachi, all of Japan

[73] Assignee: Hitachi, Ltd., Tokyo, Japan

[21] Appl. No.: 131,011

[22] Filed: Oct. 1, 1993

Related U.S. Application Data

[63] Continuation of Ser. No. 857,712, Mar. 25, 1992, abandoned, which is a continuation of Ser. No. 494,964, Mar. 16, 1990, abandoned.

[30] Foreign Application Priority Data

Mar. 17, 1989 [JP] Japan .................................. 1-063746

[51] Int. Cl.$^5$ ............................................. G06F 15/20
[52] U.S. Cl. ........................... 364/424.01; 364/424.04; 364/424.05; 364/424.1; 364/431.04; 364/431.08; 280/707
[58] Field of Search ...................... 364/424.01, 431.11, 364/424.05, 424.1, 424.03, 431.04, 431.08, 424.04; 74/866; 280/707

[56] References Cited

U.S. PATENT DOCUMENTS

| | | | |
|---|---|---|---|
| 4,437,334 | 3/1984 | Pischinger | 73/35 |
| 4,606,005 | 8/1986 | Ribbens | 364/431.01 |
| 4,630,583 | 12/1986 | Suzuki et al. | 123/425 |
| 4,648,040 | 3/1987 | Cornell et al. | 364/424.1 |
| 4,663,713 | 5/1987 | Cornell et al. | 364/424.1 |
| 4,663,714 | 5/1987 | Cornell et al. | 364/424.1 |
| 4,691,285 | 9/1987 | Takeda | 364/424.1 |
| 4,744,031 | 5/1988 | Takeda et al. | 364/424.1 |
| 4,760,275 | 7/1988 | Sato et al. | 307/10.1 |
| 4,843,557 | 6/1989 | Ina et al. | 364/431.11 |
| 4,853,850 | 8/1989 | Krass, Jr. et al. | 364/424.1 |
| 4,944,199 | 7/1990 | Okino et al. | 74/866 |

FOREIGN PATENT DOCUMENTS 0058390 8/1982 European Pat. Off. .
0230735 8/1987 European Pat. Off. .

OTHER PUBLICATIONS

IEEE Spectrum, vol. 23, No. 6, Jun. 1986, New York, U.S. pp. 53-59-R. K. Jurgen "Coming From Detroit: Network on Wheels".
Pros of the Int Cong on Transportation Electronics (1986), pp. 223-238, "Overview and Future Plan of Automotive Electronic Systems", A. Numazawa.

*Primary Examiner*—Thomas G. Black
*Assistant Examiner*—Collin W. Park
*Attorney, Agent, or Firm*—Ladas & Parry

[57] ABSTRACT

A vehicle control apparatus and method therefor has a number of controllers (50, 63, 56) interconnected with one another by a data highway (10), the engine controllers being formed for example by a CPU. The engine controllers are each connected to a sensor for sensing a vehicle parameter and the controllers are also connected to a respective actuator (53, 58) for varying the associated vehicle parameter. The apparatus is arranged so that the controllers operate in cooperation with one another so that two or more controllers cooperate to control the same object or purpose. As an example (shown in FIG. 20) an engine controller (50) provides torque data to a transmission controller (63) which in turn provides data to a throttle controller (56), whereby a gear shift is effected by the transmission controller (63) in synchronism with the throttle controller (56) changing the position of a throttle actuator so that a jerk-free gear shift is effected. In another embodiment (shown in FIG. 33) an engine controller (50) cooperates with a throttle controller (56) and a suspension controller (64) whereby data from the engine controller determining whether the vehicle is accelerating or braking is transmitted to the throttle controller (56) and the suspension controller (64) and the throttle position is adjusted in synchronism with the suspension controller (64) for adjusting the front-back ride height of the vehicle. Thus, for example, when the vehicle is braking, the throttle controller closes the throttle and the suspension controller increases the ride height of the front dampers and reduces the ride height of the rear dampers. Other embodiments control ignition timing and fuel injection in cooperation with gear shift (FIG. 37), control fuel (Abstract continued on next page.)

injection pulse width and ignition timing in cooperation with a knock detector controller (FIG. 49), and upon detection of abnormal data received from sensors display a warning of the abnormality, and in the event of seriously abnormal data being detected transmits a pseudo signal to ensure that the vehicle keeps running.

16 Claims, 35 Drawing Sheets

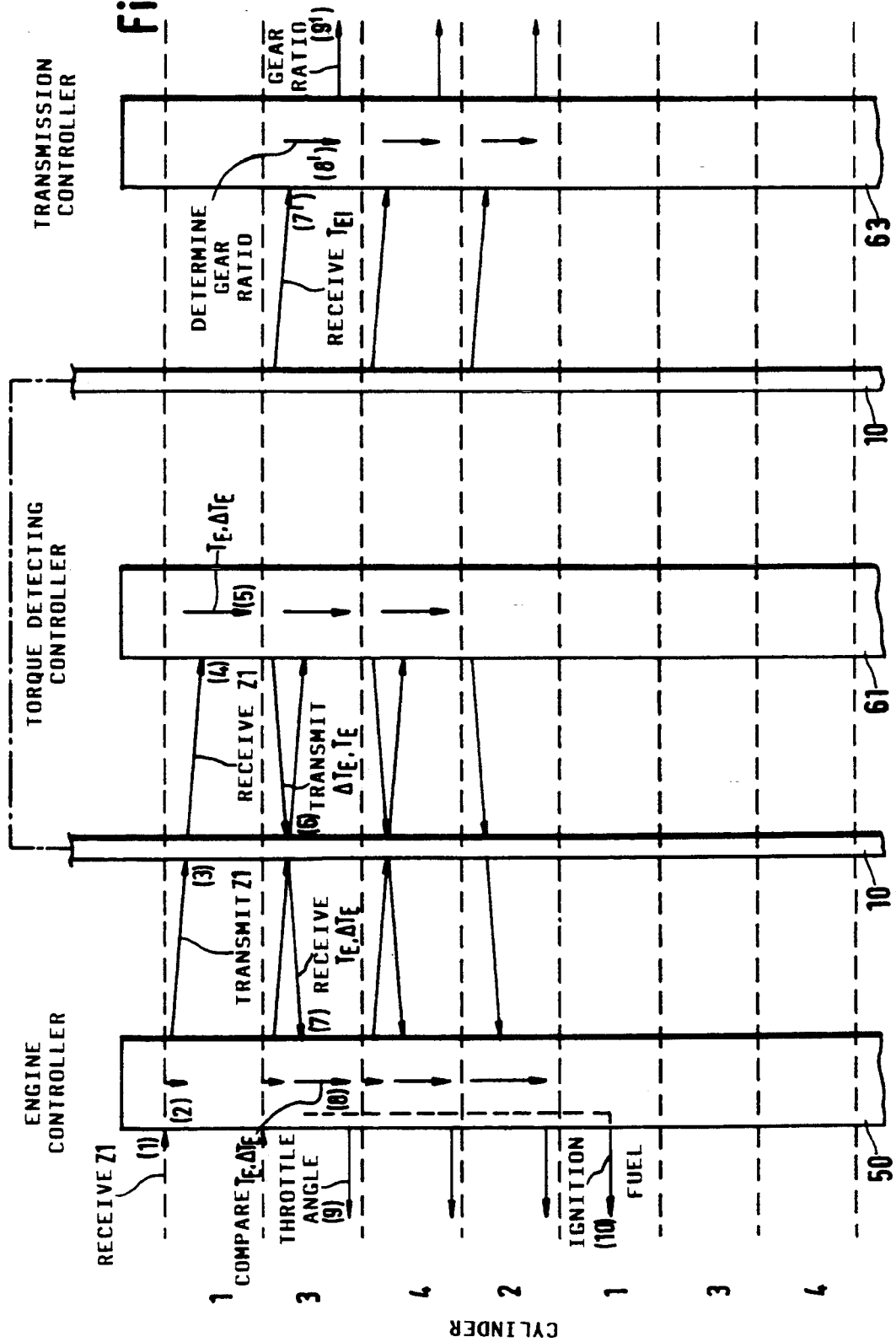

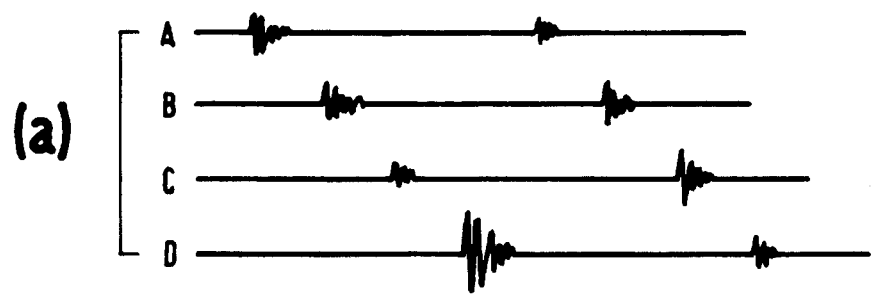
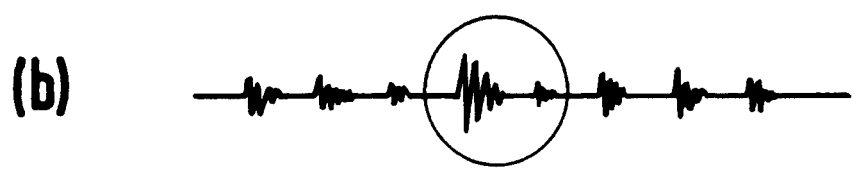
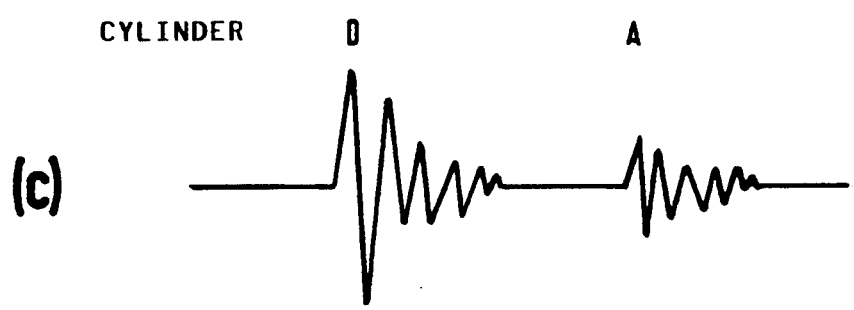
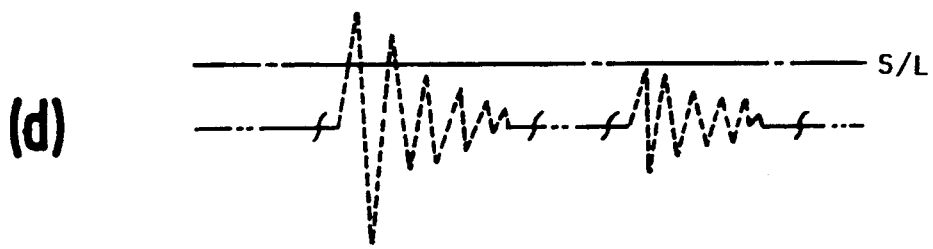
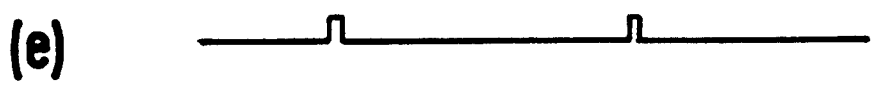
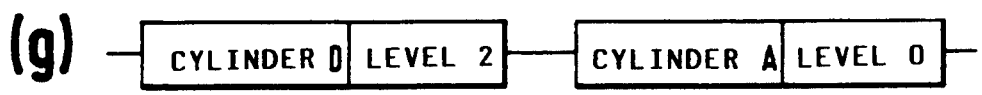
Fig. 46

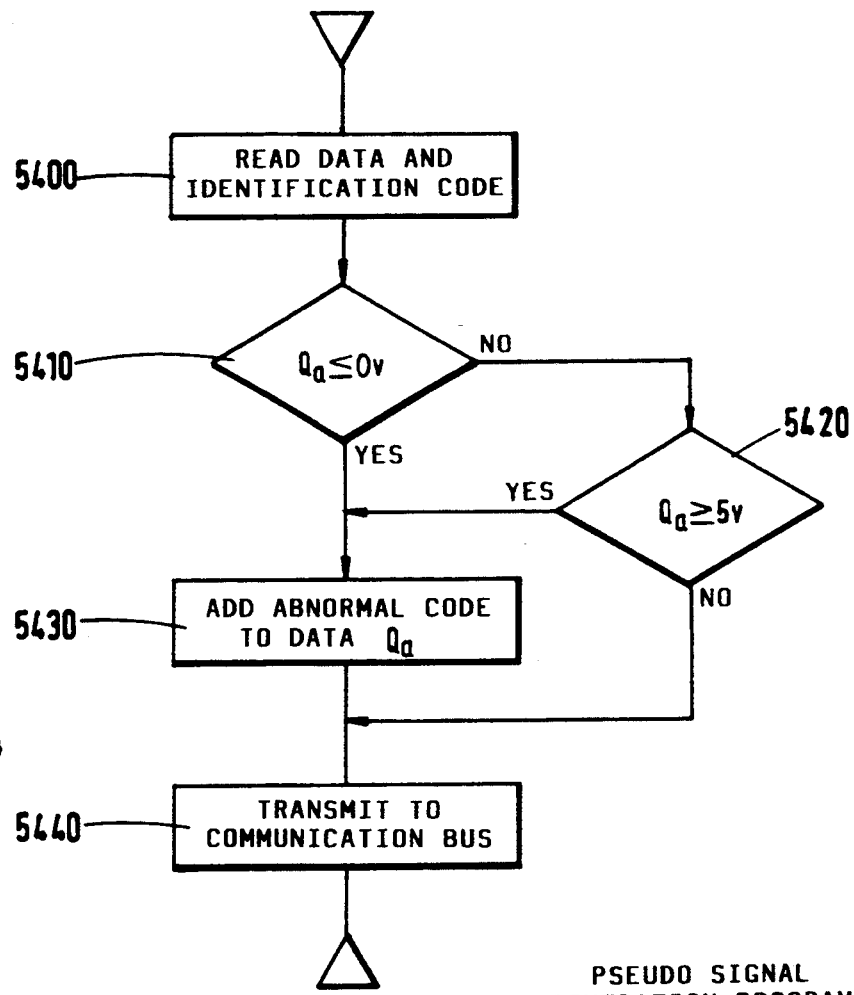
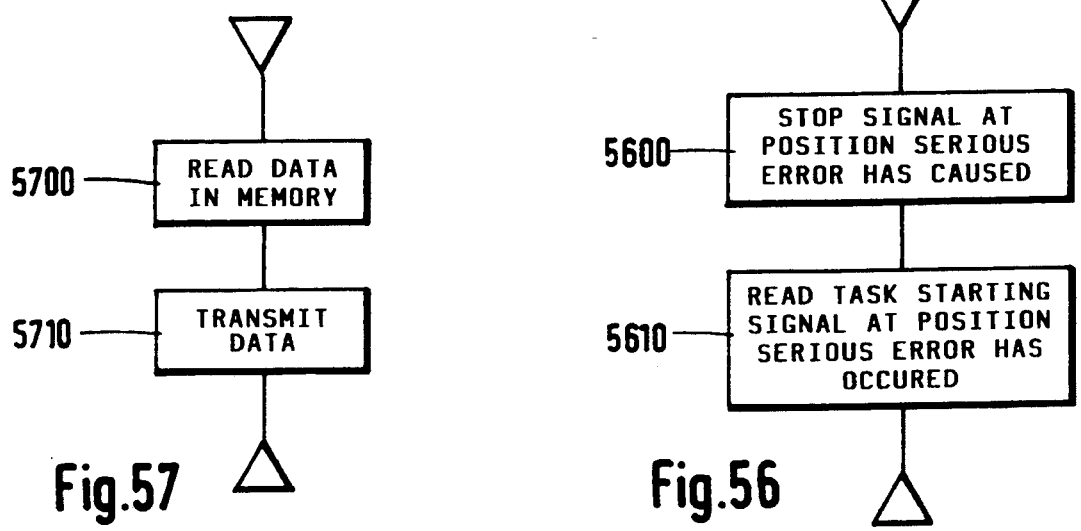
Fig.54  Fig.57  Fig.56

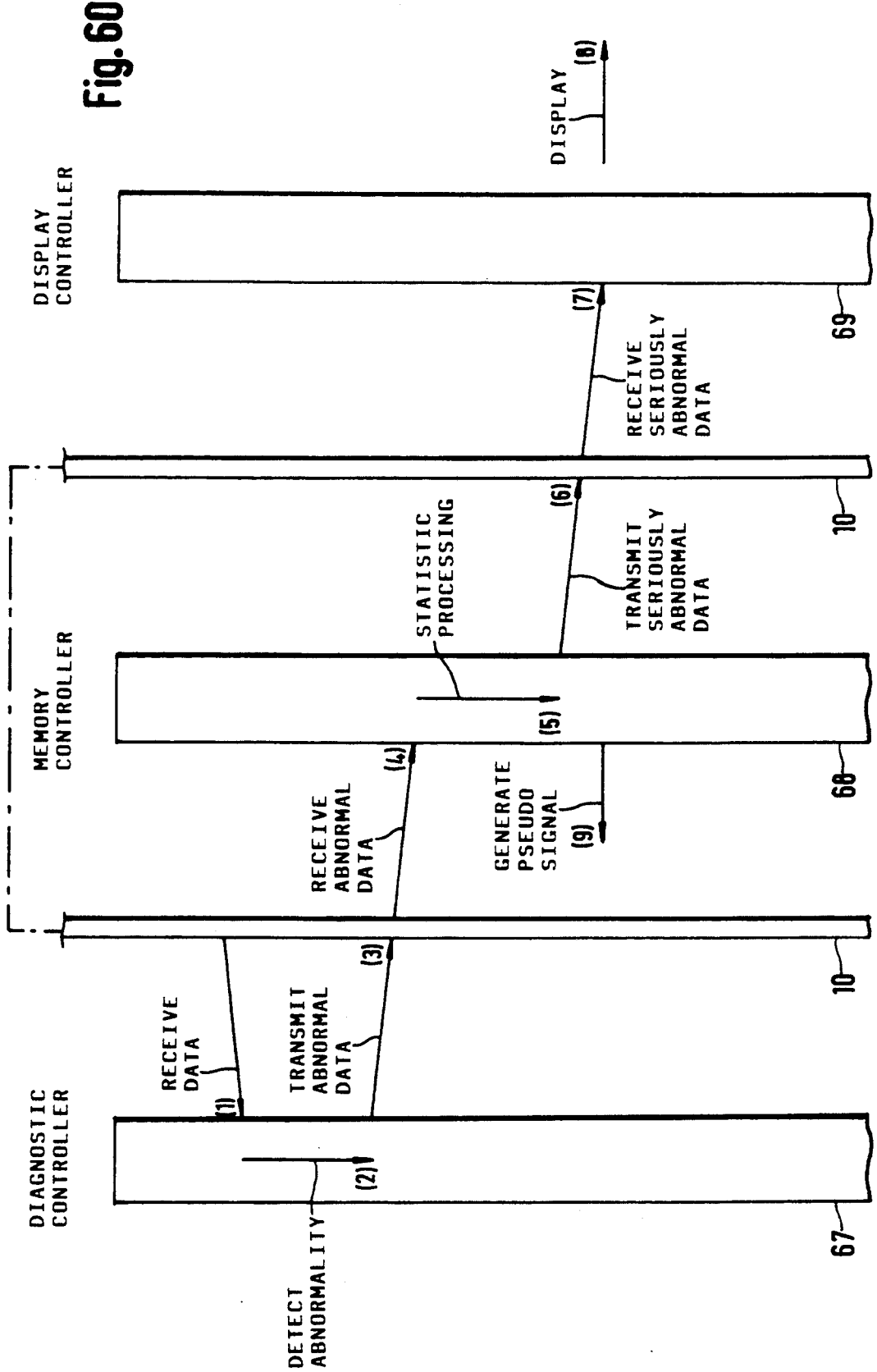

1

VEHICLE CONTROL APPARATUS AND METHOD THEREFOR

This is a continuation of copending application Ser. No. 07/494,857,712, filed on Mar. 25, 1992, now abandoned, which is a continuation of Ser. No. 07/494,964 filed on Mar. 16, 1990, now abandoned.

BACKGROUND OF THE INVENTION

1. Field of the Invention

The present invention relates to a vehicle control apparatus and method therefor, and particularly, although not exclusively, to an automobile provided with at least two computers, and a transmission path between the computers over which data may be transmitted.

2. Description of the Related Art

Conventional automotive data processing apparatus only regulates the form of transmission and reception of data between a plurality of computers, the format of the data for messages including data, the structure of an LSI for transmission and reception and the types of data (e.g., engine temperature, number of revolutions, load), as described in Japanese Patent Laid-Open No. 195453/1986 but the arrangement for controlling an automobile using such data has not previously been considered.

In the prior art, a controlling method, a method of transmitting and receiving data, the type of data and the timing for transmitting and receiving data so as to actually control an automobile have not been taken into consideration.

In a system of distributing computers and connecting those computers in a network so as to control an automobile, it is desirable that a plurality of computers exchange the results of calculation or simultaneously operate in accordance with the content of the control data. In the prior art system, however, control is restricted to each computer and the benefit of a computer network system is not used to best advantage.

It is an object of the present invention to operate distributed computers which act as controllers in cooperation with each other so that they are all similarly controlled.

SUMMARY OF THE INVENTION

According to a first aspect of this invention there is provided a vehicle control apparatus including first and second adjusting means for adjusting first and second controlled parameters of said vehicle, first and second control means for controlling said first and second adjusting means respectively, a signal communication path interconnecting said first and second control means, transferring means for transferring signals over said communication path representative of a condition to be controlled determined by one of said control means to the other of said control means, said first and second control means being adapted to control their respective first and second adjusting means in coordination with one another.

Preferably there is provided more than two adjusting means, each for adjusting a respective parameter of said vehicle and each adjusting means being arranged to be controlled by a respective control means, all of said control means being interconnected to one another by said communication path, said transferring means being arranged to transfer data over said communication path of a condition representative of a condition to be controlled determined by one of said control means to selected other said control means, whereby said one of said control means and all of said selected other control means control their respective adjusting means in unison. Advantageously means are provided for according a priority to signals passed over said communication path. Advantageously the control means are arranged to process said controlled parameters and to perform calculations whereby said control means control their respective adjusting means substantially simultaneously with one another and conveniently the signal communication path is a data highway and said control means are microprocessors.

Said adjusting means may include at least one of a throttle actuator, a fuel injector vehicle suspension damper means, vehicle suspension height setting means.

In a preferred embodiment said control means include an engine controller for controlling engine parameters, a transmission controller for controlling a gear shift operation and a throttle controller for controlling a throttle opening angle, said engine controller being adapted to read engine data including air quantity and engine speed, calculate engine torque and to transmit said torque calculation over said communication path to said transmission controller, said transmission controller being adapted to evaluate an appropriate gear ratio and in dependence thereon to drive a gear shift actuator to effect a gear shift whereby if said transmission controller determines that a gear shift is required, said transmission controller is adapted to output a signal over said communication path to said throttle controller whereby said throttle controller is arranged to actuate a throttle actuator to open the throttle to a required angle to effect a substantially jerk-free gear shift, said gear shift actuator and said throttle actuator acting in synchronism with one another.

In another preferred embodiment the control means includes an engine controller, a throttle controller and a suspension controller, said engine controller being adapted to receive signals from an accelerator pedal angle sensor and a brake pedal angle sensor, said engine controller being adapted to provide a signal indicative of the accelerator pedal angle or of the brake pedal angle over the communication path to the throttle controller and synchronously to the suspension controller, said throttle controller being adapted to control a throttle actuator and said suspension controller being arranged to control the vehicle ride height and suspension damping force. In said another preferred embodiment the suspension controller is arranged to control vehicle height actuators and damping force actuators whereby when the vehicle is accelerating the controller is arranged to cause the front vehicle dampers to decrease their ride height, the rear vehicle dampers to increase their ride height and for the damping force actuator to stiffen, and when braking is detected by the suspension controller, said suspension controller is arranged to cause the front vehicle dampers to increase their ride height and the rear vehicle dampers to decrease their ride height, and the damping force actuator to stiffen.

In yet another preferred embodiment the control means includes an engine controller, a torque detecting controller and a transmission controller, said engine controller is connected to a means for determining a cylinder causing a power stroke and said engine controller is adapted to output a signal indicative of said cylinder causing a power stroke to said torque controller, said torque controller is connected to engine crankshaft torque sensors and is adapted to evaluate the engine torque, and to transmit a signal representative thereof over said communication path to said transmission controller and to said engine controller, whereupon the engine controller is adapted to compare the evaluated torque signal with predetermined torque values to thereby calculate the required amount of throttle opening and substantially synchronously therewith the transmission controller is adapted to determine an appropriate gear ratio in dependence upon the evaluated torque signal from the torque controller.

Preferably the control means include an engine controller and a knock detecting controller, the engine controller being connected to a sensing means for sensing a cylinder causing a power stroke and to an actuator means it for controlling fuel injection pulse width and ignition timing, said knock detecting controller being connected to a knock sensor, said engine controller being adapted to determine a cylinder causing a power stroke and to transmit a signal indicative thereof over said communication path to the knock detecting controller, said knock detecting controller being arranged to detect the level of knocking from the knock sensor and to transmit a signal representative thereof in combination with a cylinder identification signal over said communication path to the engine controller, whereby said engine controller is adapted to calculate the fuel injector pulse width and the ignition timing for said actuator means.

Advantageously the control means include a diagnostic controller connected to a plurality of sensors indicative of respective operating states of said vehicle, a memory controller for holding predetermined data values, and a display controller for controlling a display, the controllers being interconnected over said communication path, whereby said diagnostic controller is adapted to receive data over said communication path from said sensors and to detect an abnormality, said abnormality subsequently being transmitted over said communication patch to said memory controller, said memory controller being adapted to statistically evaluate received data and to transmit a signal over said communication path to the display controller which is adapted to drive said display, and said memory controller is adapted to produce a pseudo signal to facilitate continued operation of the vehicle in the event that a serious abnormality is detected. Preferably said memory controller is arranged to output a signal to the display controller and produce the pseudo signal only when abnormal data has been received in excess of a predetermined number of times.

According to a feature of this invention there is provided a vehicle control apparatus including first and second parameter detecting means for detecting first and second parameters of the operation of said vehicle; first and second processing means adapted to use said first and second parameters respectively; control means for controlling said first and second parameters; a communication path interconnecting the detecting means, the processing means and the control means; means for transferring a condition to be controlled over said communication path from the first processing means to the second processing means, said first and second processing means being adapted to coordinate with one another to control said control means to vary said first and second parameters.

According to a second aspect of this invention there is provided a method of controlling a vehicle including the steps of detecting the status of vehicle operation controllable parameters, a plurality of processing means each adapted to receive said controllable parameters, said processing means being connected to modify controllable parameters associated therewith, said processing means being arranged to operate upon said received data and to transmit data evaluated data to at least one other processing means, said at least one other processing means controlling the controllable parameters associated therewith in coordination with control by said processing means of controllable parameters associated with said processing means.

Preferably in said method the processing means and said at least one other processing means operate in synchronism with one another to control the parameters associated therewith simultaneously with one another.

Thus the object of the invention is achieved by a structure in which, when a controller (computer) detects the necessity for control, the controller transmits data to other controllers related to the same control function so as to operate the controllers in cooperation with one another.

Therefore, the controller which has detected the necessity for control, transmits a signal indicating the necessity for control or data based on the results of calculation performed by said controller to other controllers having a related controlling function. The signal or data may be given a priority value with respect to the data which is transmitted on other communication lines. Therefore, at any time when the necessity for control is detected, the related controllers are actuated with the control data.

In this way, since related controllers cooperate swiftly with one another, smooth operation is enabled even in a computer distribution type system.

BRIEF DESCRIPTION OF THE DRAWINGS

The invention will now be described by way of example with reference to the accompanying drawings in which

FIG. 37 shows the flow of data for the controllers of FIG. 36;

FIG. 46 is a time chart of the knocking sensors;

FIGS. 54 to 57 are flowcharts for the diagnostic device;

FIG. 60 shows the flow of data between the diagnostic memory and display controllers.

In the Figures like reference numerals denote like parts.

DESCRIPTION OF THE PREFERRED EMBODIMENTS

Figure 1:
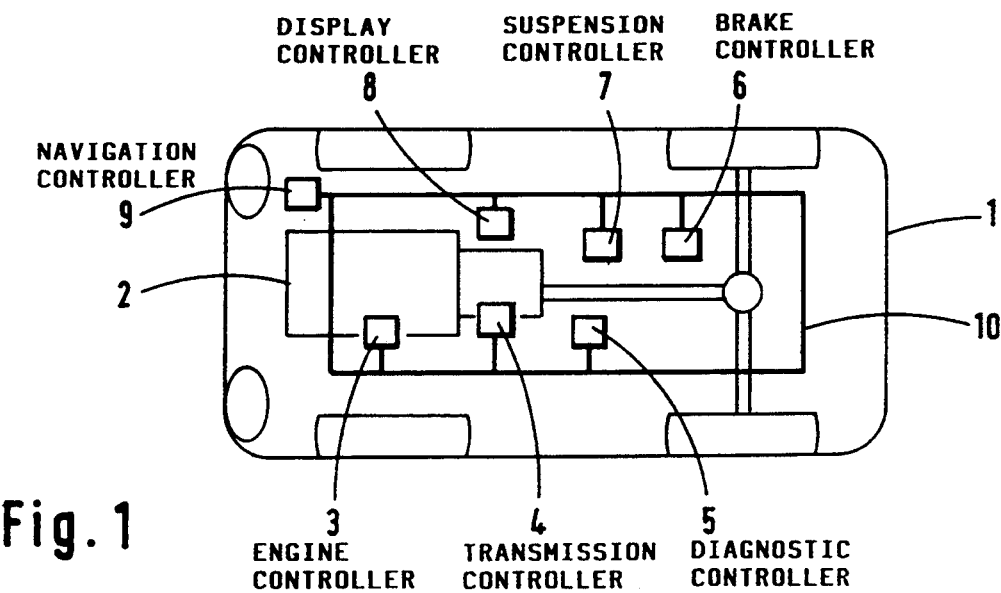
FIG. 1 is a schematic view of a vehicle control apparatus in accordance with this invention.

FIG. 1 shows the entire structure of a local area network (LAN) of an automobile.

A system 1 is provided with a control unit for exclusive use of each control element such as an engine, transmission, diagnostic device, brake, suspension, warning indicator and navigation system. Each of the control units performs control and measurement of an associated element. Only information that is necessary in operation is transmitted and received between a control unit and another control unit on a communication bus 10 which utilises serial transmission.

In the system 2 shown, each of the devices, including control units connected to associated elements to be controlled and transmission and reception devices, can be called a node, as usual in the field of a network technique. This system is provided with exclusive nodes such as an engine controller 3, a transmission controller 4, a diagnostic device controller 5, a brake controller 6, a suspension controller 7, a display controller 8 and a navigation controller 9. In FIG. 1, reference numeral 2 denotes an engine.

Figure 2:
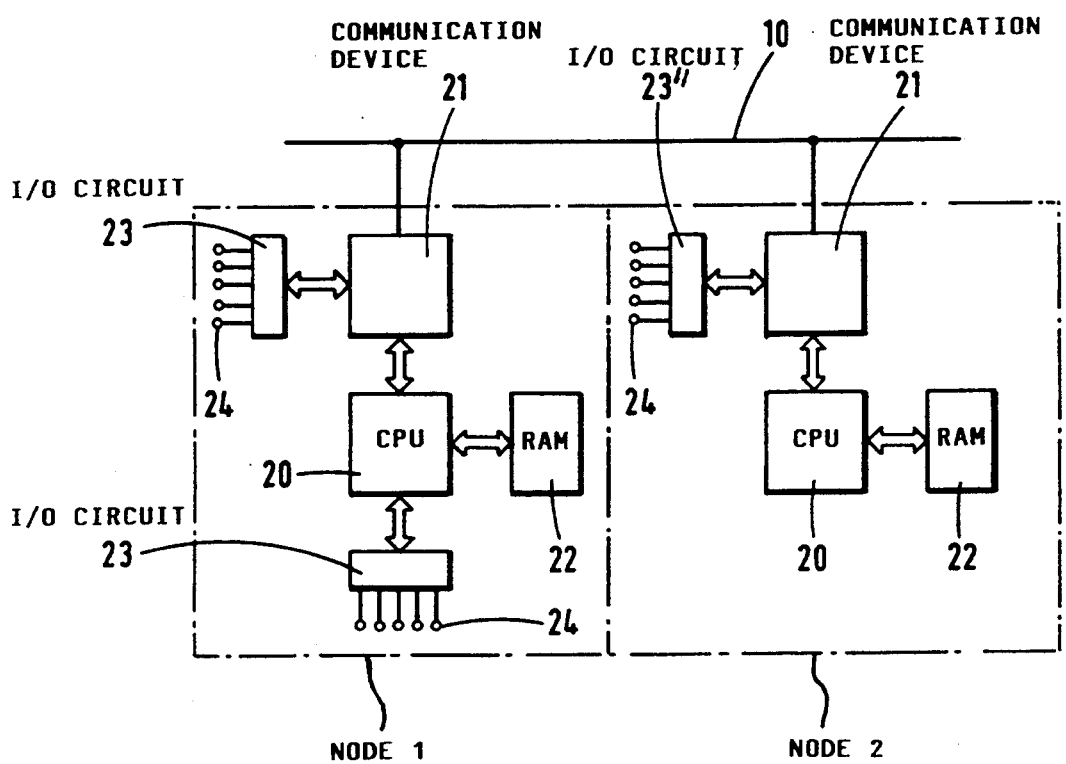
FIG. 2 is a more detailed view of the apparatus shown in FIG. 1.

FIG. 2 shows an example of the structure of each node. A communication device 21 is connected to the communication bus 10. The communication device 21, carries out the transmission of data from a computer (CPU) 20 or the reception of data from the communication bus 10. The communication device 21 also controls the timing for data transmission, checks for data errors and judges the priority order of data. Because of the functional operability of the communication device 21, so the CPU 20 can concentrate on the control of the associated control elements. In order to transmit data, the procedure is to write the data in the memory of a predetermined address in the communication device 21 and for the device 21 to request transmission over the communication bus. On the other hand, in the case of reception, it is only necessary to supply a request for reception to the communication device 21 and read the data into the memory thereof. Data transmitted and received in this way is information which is necessary for a plurality of nodes to simultaneously execute related operations.

In the structure of node 1, the CPU 20 is connected to the communication device 21, and further a RAM 22 and an input/output circuit 23 are connected to the CPU 20. Devices 24, such as a sensor and an actuator, are connected to the input/output circuit 23 so as to control the parameters of variable elements to which they are attached. It is also possible to connect the input/output circuit 23' to the communication device 21. Node 2 has a simplified structure in which control is carried out only by the input/output circuit 23' connected to the communication device 21.

Figure 3:
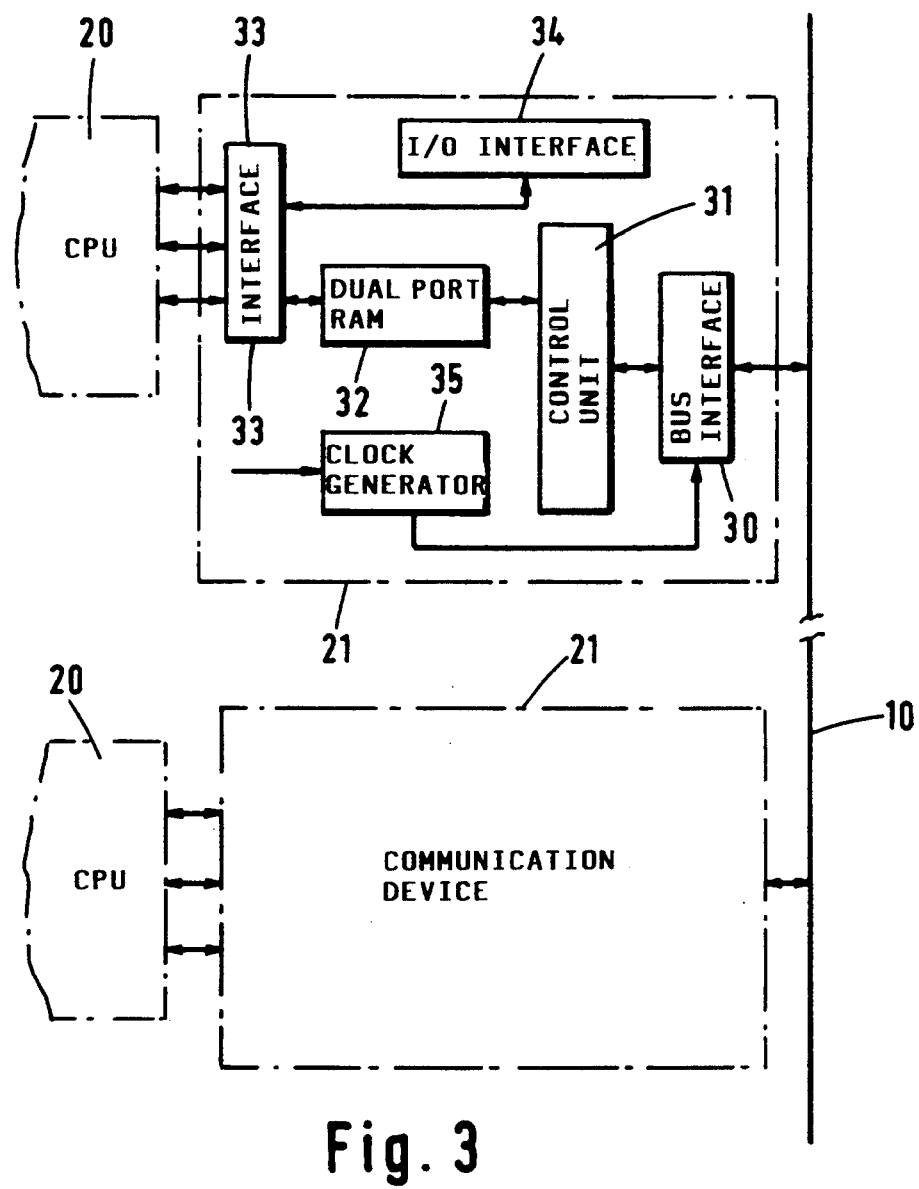
FIG. 3 is a detailed view of a communication device used in this invention.

FIG. 3 shows the details of the communication device 21. A control unit 31 executes the command related to transmission and reception which is supplied from the CPU 20. A bus interface 30 performs the function of judging an error in data, timing control, etc. When the CPU 20 transmits data to another node, the data is written in a special address on a dual port RAM 32 through an interface 33. A request for transmission is next supplied to the control unit 31. The control unit 31 scans the memory on the dual port RAM 32 to obtain the corresponding data and transmits it to the communication bus 10 through the bus interface 30. The bit timing of data is controlled by a clock generator 35. An I/O interface 34 executes the output/input control of a signal of the communication device 21 in accordance with a command from the CPU 20.

Figure 4:
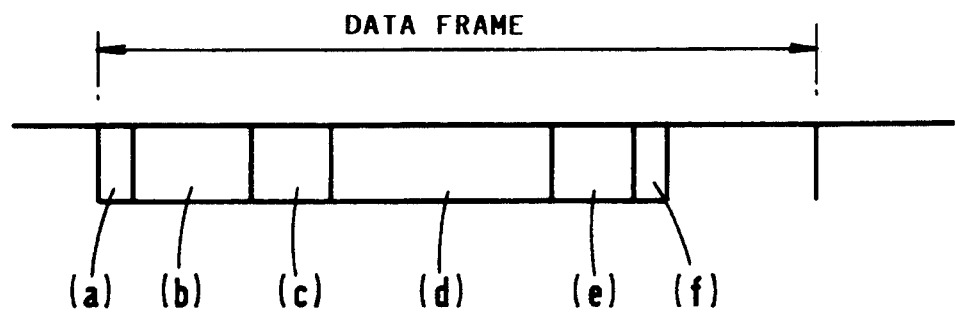
FIG. 4 shows the structure of data frame.

FIG. 4 shows the structure of the data frame supplied to the communication bus 10. The symbol (a) represents a start bit indicating the start of the data frame, (b) represents bits indicating the priority level, the destination or the like of data, (c) represents a control bit indicating the length of the data shown in (d) which represents a data portion, (e) represents an error check portion and (f) represents an end bit indicating the end of the data frame. The bits (b) can be set by the CPU 20.

Figure 5:
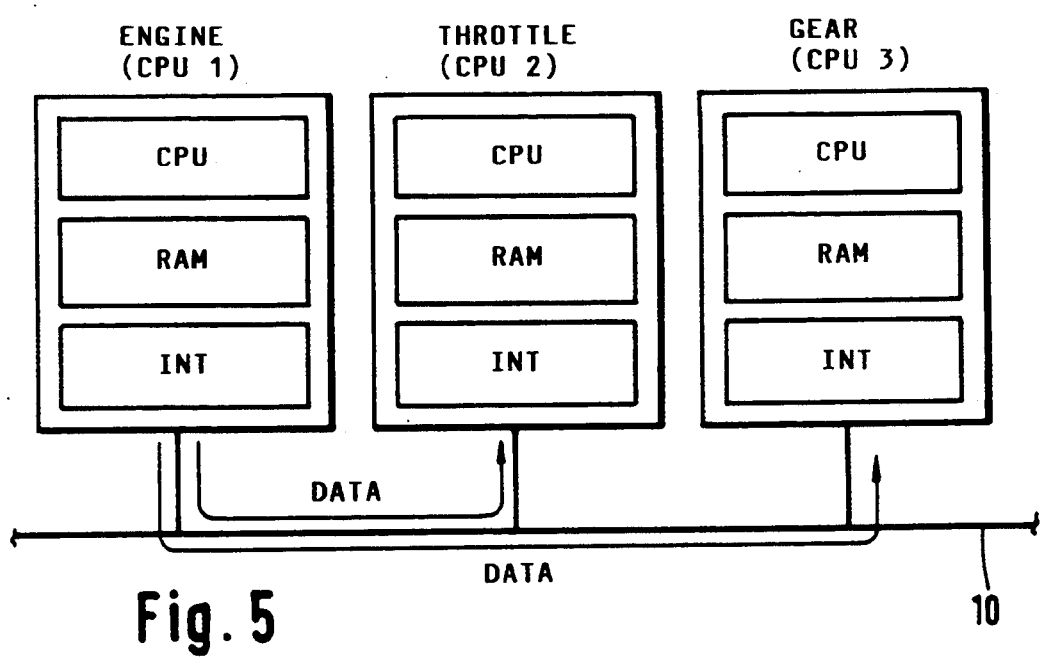
FIG. 5 shows the connection of controllers (computers)

As shown in FIG. 1, data measured and calculated by one node is serially transferred to the CPUs 20 of a plurality of nodes through the communication bus 10. A plurality of CPUs 20 thus operate in cooperation with each other for the same controlling object. As shown in FIG. 5, if CPU 1, CPU 2 and CPU 3 are connected with each other through the communication bus 10, the data measured and processed by the CPU 1 is transferred to the CPU 2 and CPU 3. In the present invention, the CPU 1, CPU 2 and CPU 3 operate in cooperation with each other for the same unifying controlling object or purpose. In this case, the data necessary for the operation is transmitted and received between the CPUs. For example, in the case of shifting gears in an automobile, it is desirable to operate a throttle at the same time as switching the transmission gear ratios. In the computer distribution type system such as that of the present invention, separate CPUs are operated. For example, if it is assumed in FIG. 5 that the CPU 1 is a CPU for controlling an engine, the CPU 2 is a CPU for controlling a throttle which as well as being driver actuable is also actuable by a motor or the like, and the CPU 3 is a CPU for controlling an electrically operated gear box transmission, the CPU 1, CPU 2 and CPU 3 operate in cooperation with each other for the same controlling object, which in this case is to control the gear changing operation.

The CPU 1 measures the number n of revolutions of the engine and the amount $Q_a$ of air and supplies the data to the CPU 3. The CPU 3 determines the gear ratio of the transmission on the basis of this data. The information on the thus-determined gear ratio is supplied to the CPU 2, which calculates the required throttle opening corresponding to the engine speed and gear ratio. After these processings, the CPU 2 sets the throttle opening angle at the desired position for a smooth gear change. The CPU 3 simultaneously shifts the gears in cooperation with the CPU 2. In this example, the timing for the operation may be determined either by the CPU 2 or CPU 3. The forementioned gear change operation is more fully described hereinafter with reference to the accompanying FIGS. 14–20.

The flowcharts for the cooperative control between the CPU 1 and the CPU 2 will now be explained.

Figure 6:
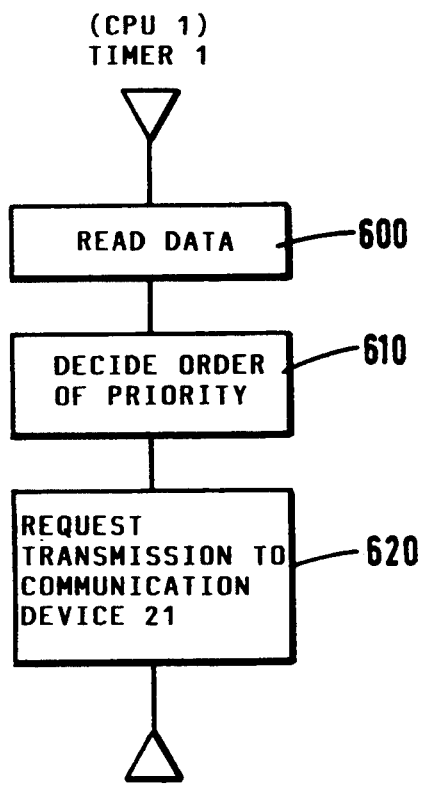
FIGS. 6 to 11 are flowcharts showing the operation of the invention.
Figure 7:
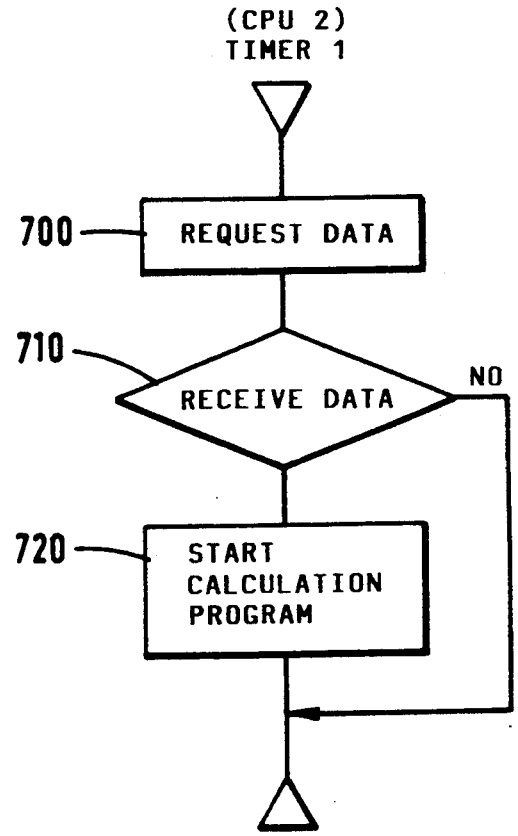
Figure 8:
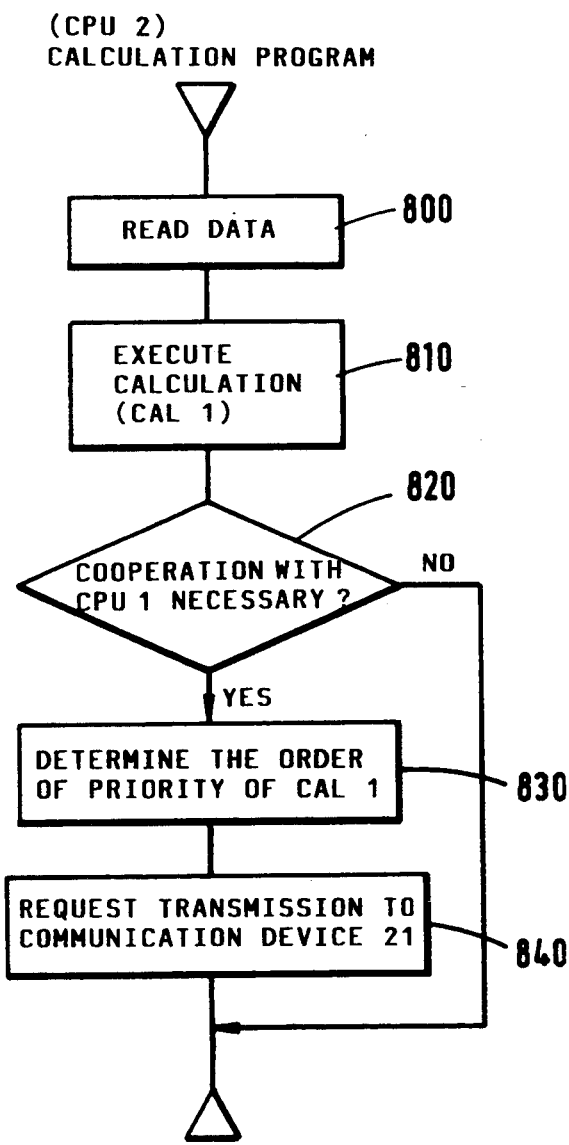
Figure 9:
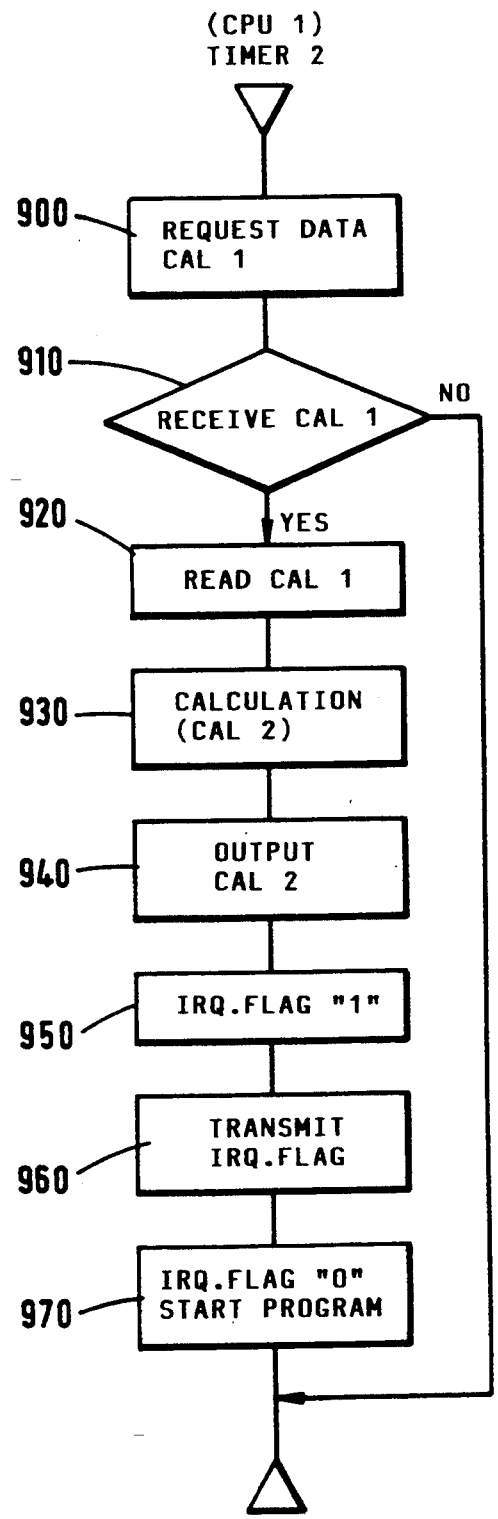
Figure 10:
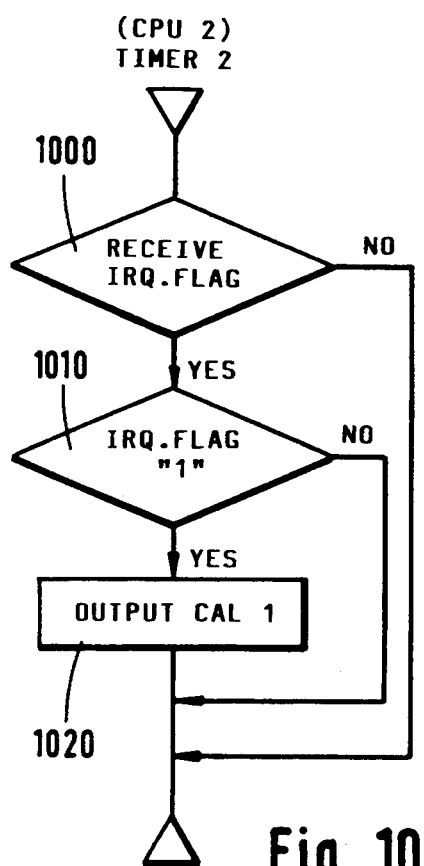
Figure 11:
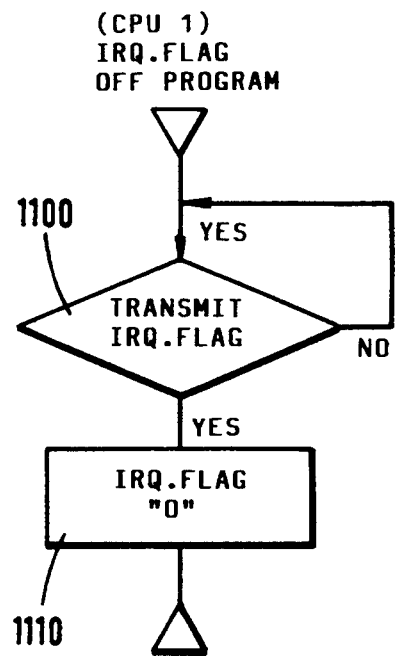

FIGS. 6, 9 and 11 are flowcharts for the CPU 1, and FIGS. 7, 8 and 10 are flowcharts for the CPU 2.

Referring first to FIG. 6, the CPU 1 reads the data n and $Q_a$ from sensors at the step 600. At the step 610, the priority order of the data is determined and at the step 620 a request for transmission is supplied to the communication device 21.

In FIG. 7, the CPU 2 supplies a request for data reception at the step 700, and determines if data is received from the CPU 1 at the step 710. At the step 720, the calculation program is started on the basis of the data.

FIG. 8 shows the calculation program of the CPU 2. At the step 800, the data is read and at the step 810, a predetermined calculation is executed to obtain the result cal 1. At the step 820, judgment is made as to whether or not the cooperation with the CPU 1 is necessary. This judgment is made on the basis of the result cal 1 of the calculation carried out at the step 810. When the cooperation with the CPU 1 is judged to be necessary, the priority order is allotted to the result of calculation cal 1 at the step 830 and a request for transmission to the CPU 1 is output at the step 840.

The CPU 1 requests, at step 900, of FIG. 9, the reception of the result of the calculation result and judges at the step 910 whether or not data (CAL 1) of the result is received. If received, the CPU 1 reads, at the step 920, the received data (CAL 1) and executes, at the step 930, a further predetermined calculation on the basis of the received data (CAL 1) to obtain the result (CAL 2).

The CPU 1 and the CPU 2 substantially simultaneously control the objects of control, i.e. the apparatus/devices to be controlled, which are connected to the respective CPUs on the basis of the results (cal 1 and cal 2) of calculations. More specifically, after the CPU 1 outputs the result cal 2 of calculation and controls the actuator directly associated with CPU 1, the CPU 1 transmits an interruption request, IRQ. FLAG to the CPU 2, which immediately executes control of the actuator directly associated with CPU 2, as shown at the steps 950 to 970. In this case, it is necessary to allot the higher transmission priority to data of the IRQ.FLAG than to other data, whereby the CPU 1 and CPU 2 are substantially simultaneously enabled to control the respective actuators associated therewith. FIG. 10 shows the operation of the CPU 2. As soon as the IRQ. FLAG is received, the CPU 2 outputs the result cal 1 of calculation as the external output and controls the actuator associated with CPU 2, as shown at the steps 1000 to 1020 if the IRQ. FLAG is high, i.e. logic level 1.

Finally, at the step 970 shown in FIG. 9, the IRQ. FlAG is turned OFF (logic level 0), thereby ending the process. This operation is shown at the steps 1100 to 1110 in FIG. 11. The timing for the cooperative operation is determined by reciprocity between the CPU 1 and the CPU 2.

In this way, the cooperative operation is carried out by at least two CPUs through the communication bus 10.

Figure 12:
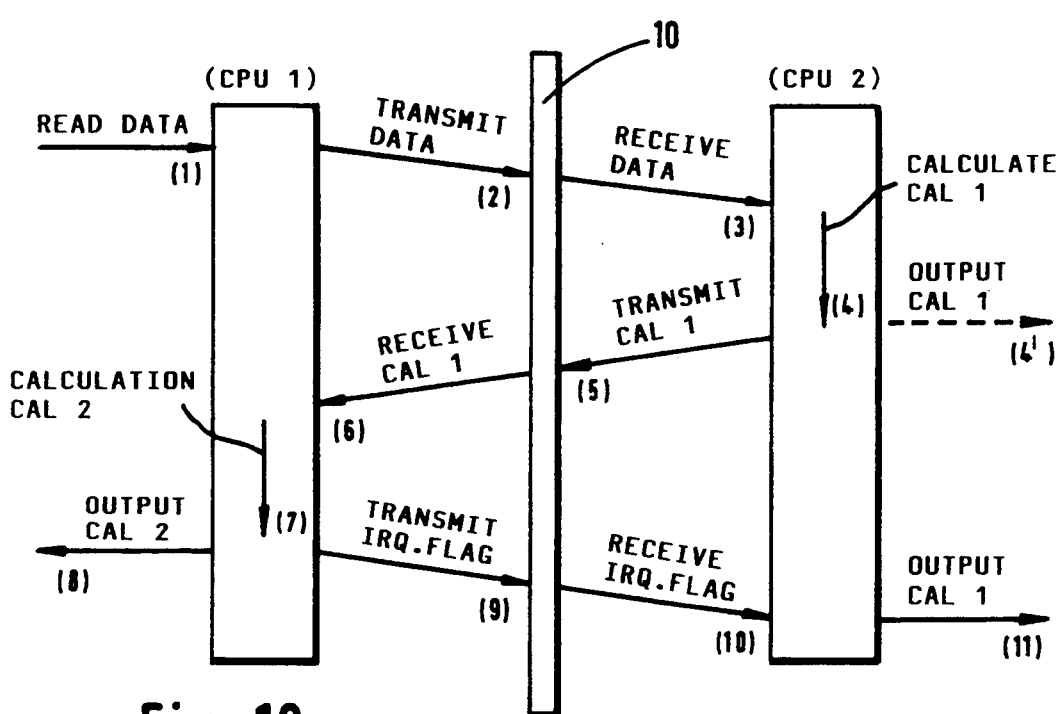
FIG. 12 shows the flow of data in the invention.

FIG. 12 is an explanatory view of these flowcharts simplified for making them easier to understand.

The CPU 1 first reads (1) data and transmits (2) the data to the communication bus 10, and the CPU 2 receives (3) the data. The CPU 2 calculates (4) on the basis of this data to obtain the result cal 1.

The result cal 1 of calculation is transmitted (5) to the communication bus 10 and is received (6) by the CPU 1.

On the basis of the result cal 1 of calculation, the CPU 1 calculates (7) to obtain the result cal 2.

The result cal 2 of calculation is output (8) to sensors/actuators and the CPU 1 outputs and transmits (9) an interruption request (IRQ. FLAG) to the communication bus 10, the interruption request being received (10) by the CPU 2. The CPU 2 outputs (11) the result cal 1 of calculation to the appropriate element to be controlled.

In the case shown in FIG. 12, since it is necessary to substantially simultaneously output the cal 1 and cal 2, at the time of IRQ. FLAG transmission, the data is given priority over other data so as to be transmitted earlier than said other data. The difference in timing between the cal 1 and the cal 2 is only a transmission delay of the IRQ. FLAG. In this way, the timing accuracy for cooperative control is enhanced.

In FIG. 12, it is possible that the cal 1 is output (4') after the calculation (4) of the cal 1. In this case, it is necessary to set the highest priority to the transmission of the cal 1 in order to hasten the output of the cal 2. By doing so, it is possible to substantially simultaneously output the cal 1 and the cal 2. The difference in timing between the cal 1 and the cal 2 corresponds to the transmission delay of the cal 1 and the calculation delay of the cal 2. This method is effective when the calculation time for the cal 2 is short.

When the calculation of the cal 2 is complicated and takes a long time, it is necessary to take the steps from (1) to (11).

In the example shown in FIG. 12, the timing for outputting the cal 1 and the cal 2 is determined by the CPU 1 or the CPU 2. In this way, the operational timing can be selected in accordance with the content of control. That is, the operational timing is changed by giving a high priority order to the data transmission of the cal 1 and the IRQ. FLAG, if the control is urgent, and giving a low priority thereto in the case of a comparatively slow control.

Figure 13:
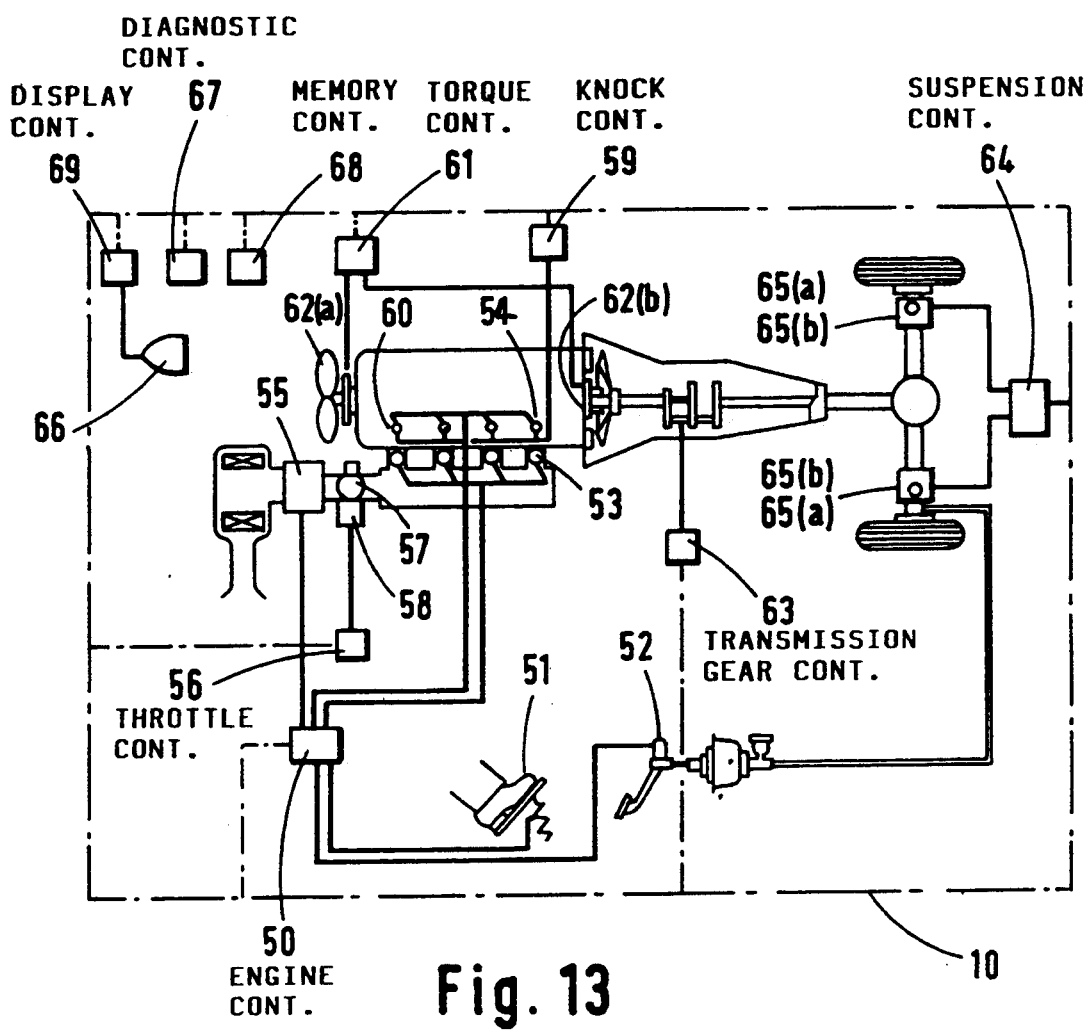
FIG. 13 is a schematic view apparatus in accordance with the present invention.

FIG. 13 shows the structure of a hardware embodiment of the present invention which will now be referred to.

A controller 50 controls an engine to which are connected, for example, an accelerator pedal angle sensor 51, a brake pedal angle sensor 52, a fuel injection valve (injector) 53 for each cylinder, an ignition plug 54 for each cylinder and air flow Qa meter 55.

A throttle controller 56 is connected to a throttle value 57 having an angle actuator 58.

A knocking sensor 60 (provided in each cylinder) provides signals to a controller 59 which analyses the signals and provides output to the engine controller 50. In this respect, it is necessary to detect a high-speed phenomenon known as knocking, and a high-speed controller 59 is used exclusively for this purpose.

A controller 61 is used for determining crankshaft torque, torque sensors 62(a), 62(b) being connected at opposing ends of the crankshaft. Since the integration of signals indicative of the intervals between explosion strokes for the respective cylinders is necessary for torque detection, the controller 61 is also a high-speed controller.

A controller 63 is used for controlling a transmission which switches a train of gears in the transmission gear box by using a motor actuator. Gear-changing operation is thus carried out at a desired time in dependence upon the automobile operating conditions.

A controller 64 for controlling the vehicle suspension control actuators 65(a) and 65(b) which each respectively change the height of the vehicle and the damping force. Although only the rear wheels are shown in FIG. 13, an actuator is also provided at the front wheels with associated sensors. The damping force is controlled by varying the diameter of the orifice of the hydraulic damper by a motor driven actuator as known per se. The height of the vehicle is controlled by providing a cylinder for varying the displacement of a piston by oil pressure as known per se.

A diagnostic controller 67 is used to detect an abnormality in the data on the communication bus 10.

A controller 68 is provided for a memory (not shown) which statistically processes abnormal data or eliminates seriously abnormal data. A display controller 69 is provided for a display 66.

The controllers 50, 56, 59, 61, 63, 64, 67, 68 and 69 are connected with each other by the communication bus 10 through their respective LSIs for serial transmission.

In such a system with each controller distributed, maintenance is simplified. Cooperative control of a plurality of controllers, however, is sometimes necessary in accordance with the content of control, such as data transmission and reception of the results of calculations and simultaneous operational control of elements.

The present invention is aimed at such cooperative control.

Figure 14:
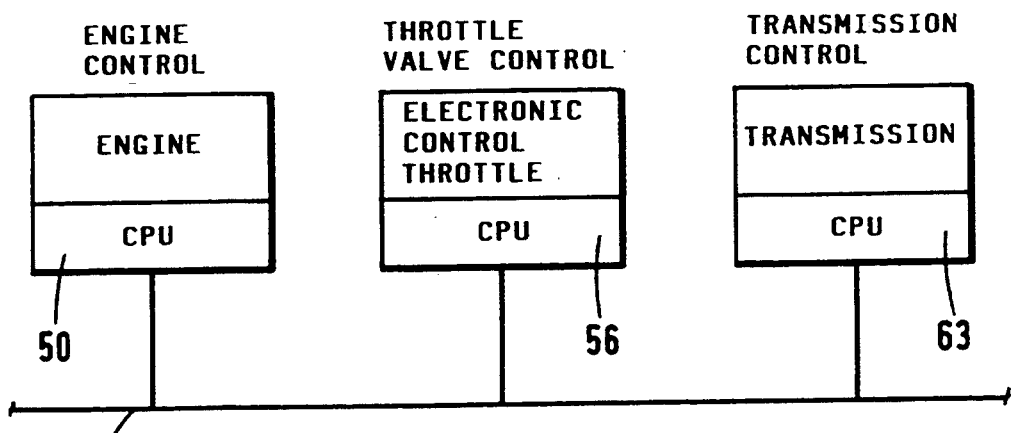
FIG. 14 is a schematic view showing connections to a data highway.

Referring to FIG. 14, controllers in the form of CPUs 50, 56 and 63 for the engine, the electronically controlled throttle, and the transmission (gear box), respectively, are connected for cooperative communication and operation with each other through the bus interface 10.

Figures 15, 16:
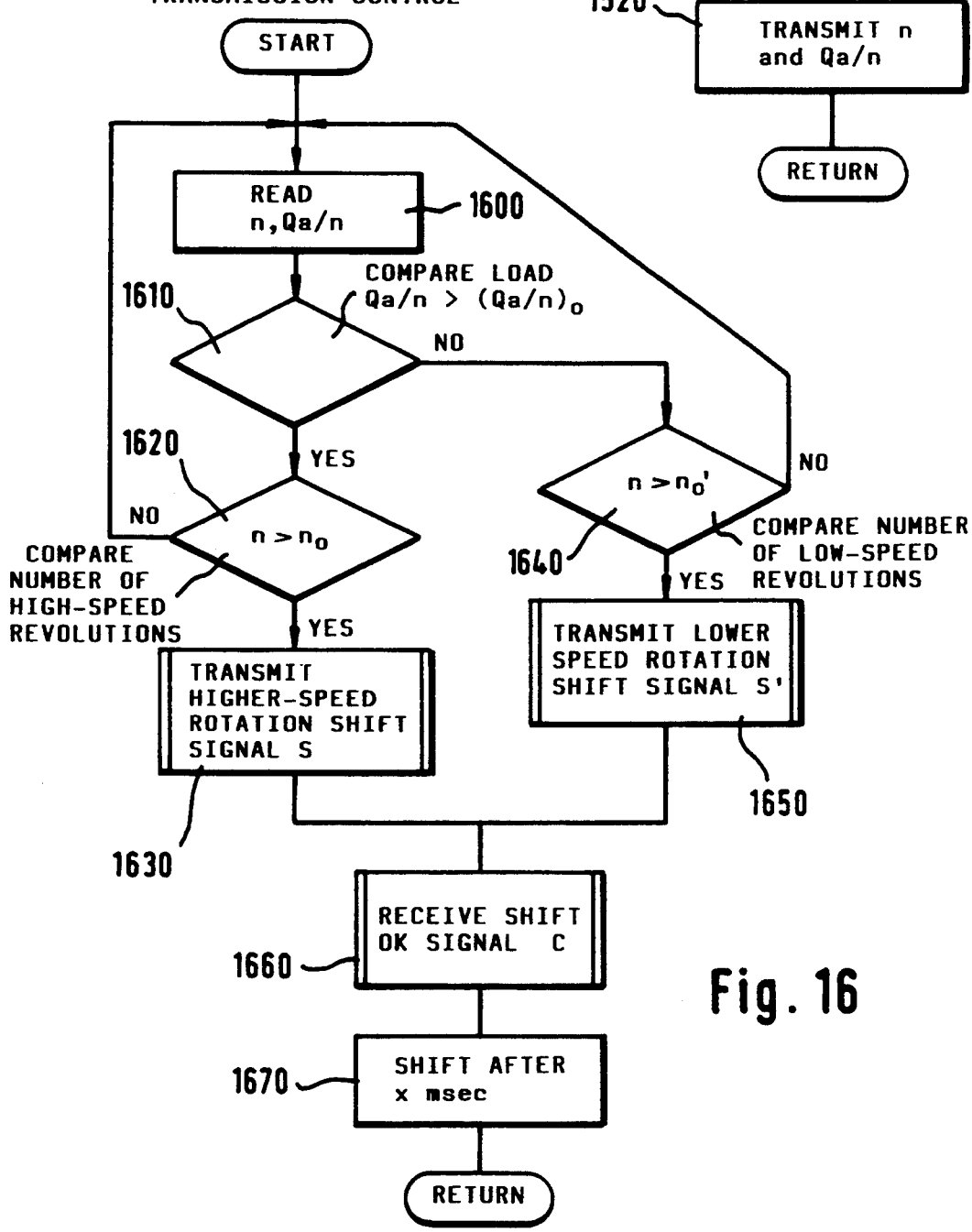
FIGS. 15 to 17 are flowcharts of various control programs.
Figure 17:
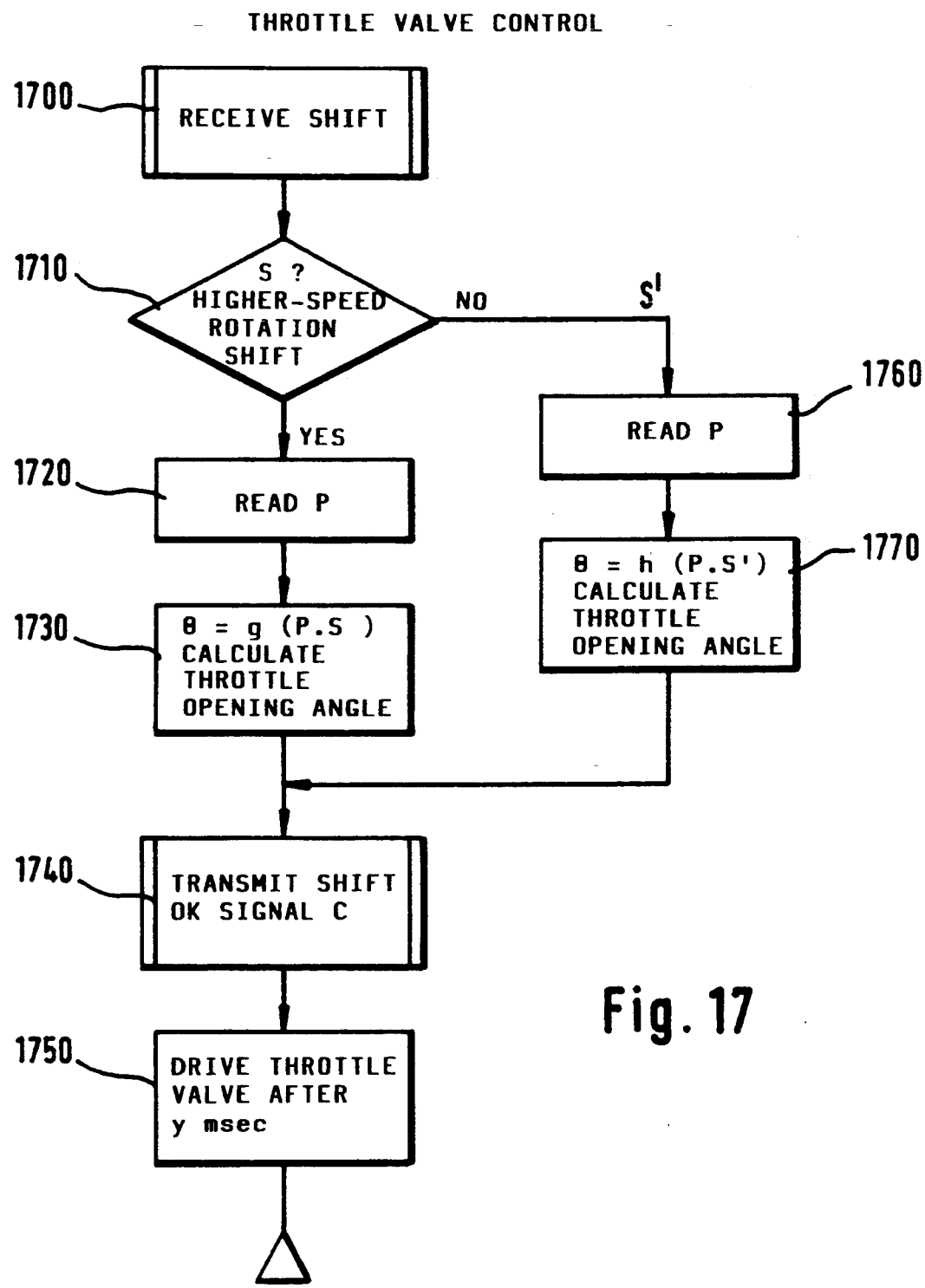

FIGS. 15 to 17 show flowcharts for the cooperative control of the engine, the throttle valve and the transmission so as to prevent gear shift shock conventionally caused by the drive from the engine. In the engine control shown in FIG. 15, the number n of revolutions of the engine is detected at predetermined intervals of time at the step 1500, and the load $Q_a/n$ is calculated from the function f(n) of n at the step 1510, where $Q_a$ is air flow rate. At the step 1520, n and $Q_a/n$ are transmitted to the throttle valve control unit and the transmission control unit through the bus 10. In the transmission control shown in FIG. 16, signals n and $Q_a/n$ are read at the step 1600, and the actual $Q_a/n$ is first compared with a predetermined load $(Q_a/n)_0$ read from a map at the step 1610. If $Q_a/n > (Q_a/n)_0$, it means the driver requires increased output from the engine, so that a gear shift is carried out to provide a higher speed range of engine revolutions. At the step 1620, the actual number n of revolutions of the engine is compared with a set number $n_0$ for engine revolutions predetermined for the range of the high speed rotation, and if $n > n_0$, a high speed rotation shift signal s is transmitted by interruption to throttle valve control unit through the bus 10 at the step 1630. If $n \leq n_0$, the signals n and $Q_a/n$ are read again. If $Q_a/n \leq (Q_a/n)_0$, since the driver's request for output from the engine is not so great, the shift is carried out in a low speed rotation range. At the step 1640, the actual number n of revolutions of the engine is compared with a set number $n'_0$ of engine revolutions predetermined for the range of the low speed rotation, and if $n > n'_0$, a low speed rotation shift signal s' is transmitted by interruption to throttle valve control unit through the bus 10 at the step 1650. If $n \leq n_0'$, the signals n and $Q_a/n$ are read again. In the throttle valve control shown in FIG. 17, an interruption signal is received from the transmission control unit through the bus 10 at the step 1700, and it is judged at step 1710 whether the interruption signal is the high speed rotation shift signal s or the low speed rotation shift signal s'. At steps 1720, 1730, 1760 and 1770, the gear position P is read, the throttle opening angle θ is calculated on the basis of P and S, and P and S', respectively. At the step 1740, a gear change OK signal is output by interruption, and at the step 1750, the throttle valve is driven after a predetermined time, for example, after y msec. Returning to FIG. 16, when the transmission control unit receives the gear change OK signal C at the step 1660, the gear is changed after x msec at the step 1670. In this case, x may be equal to y.

Figure 18A:
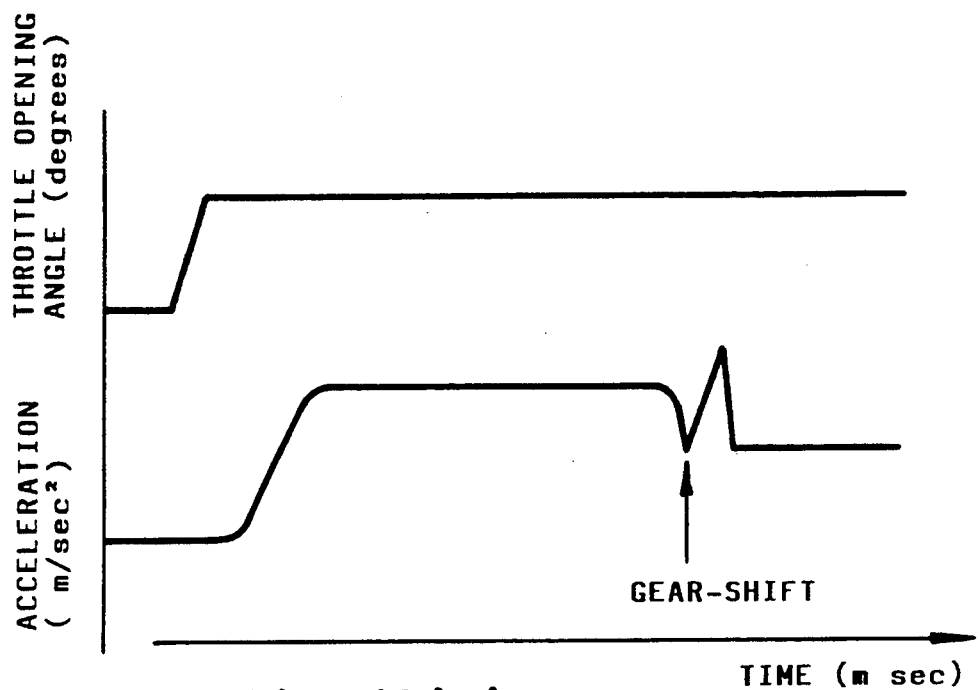
FIGS. 18(*a*) and 18(*b*) are characteristic curves of the throttle opening angle and the acceleration for the prior art and present invention respectively when a gear shift is effected.
Figure 18B:
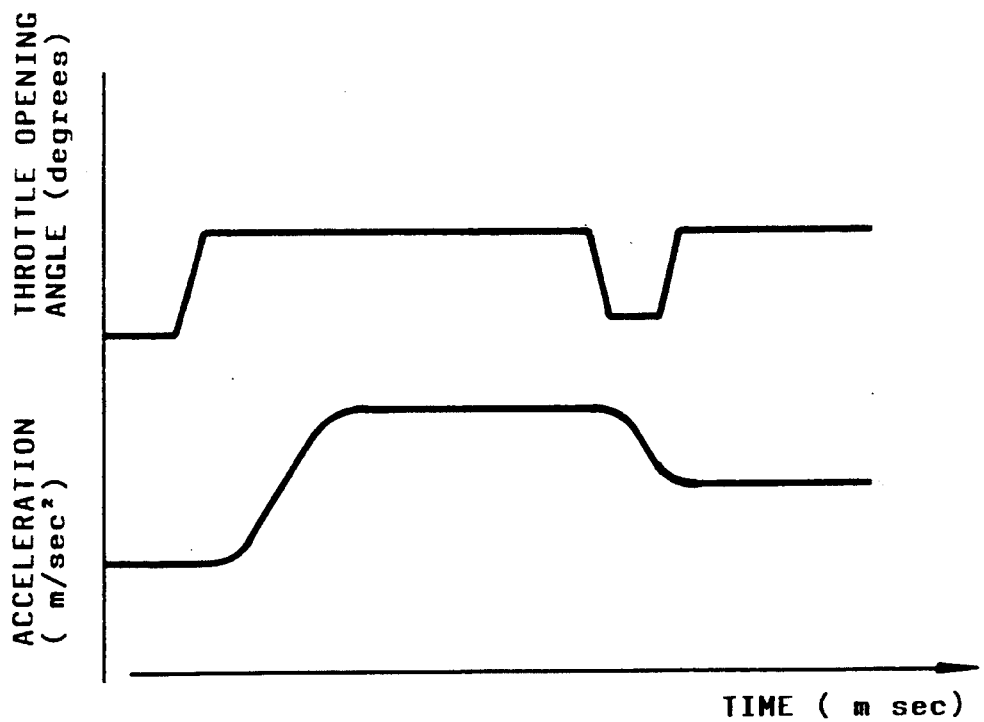

FIGS. 18(a) and 18(b) are detailed graphical views of a jerk that conventionally occurs when changing gear, wherein FIG. 18(a) shows the gear change jerk of a conventional automatic transmission vehicle, and FIG. 18(b) shows the gear change jerk reduced by the increase of the engine output in response to the increase of the throttle opening angle by using the present invention. The abscissa in FIGS. 18(a) and 18(b) is time and the upper graphical representation in FIGS. 18(a) and 18(b) is throttle opening angle and the lower representation in FIGS. 18(a) and 18(b) has an ordinate of acceleration. In the prior art of FIG. 18(a) it will be noted that the throttle opening angle is constant throughout a gear shift and the acceleration after initially rising with the throttle opening angle is then constant and there is then a trough produced when the clutch is disengaged and the gear shift is effected from a lower ratio gear to a higher ratio gear and the clutch then engaged. Following the gear shift to a higher ratio gear there then follows an inertia phase producing an increased acceleration spike before the acceleration is reduced to again be substantially constant. In distinction, in the present invention, as represented by the graphs of FIG. 18(b), the throttle opening angle is constant and then when a gear change is effected the throttle opening angle is briefly closed before being opened again. As indicated by the lower representation of FIG. 18(b) this results in a smoother gear shift without the acceleration spikes noted in the lower figure of FIG. 18(a). When a gear shift down in range, i.e. to a gear suitable for a lower speed range, then the throttle opening in accordance with the present invention is increased at the moment of gear change.

Figure 19A:
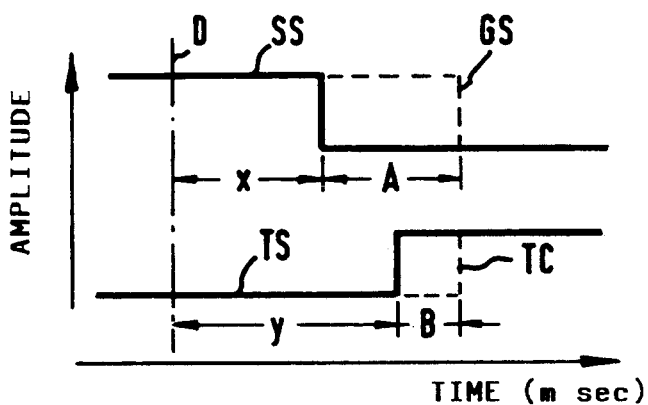
FIG. 19(*a*) is a timing diagram and FIGS. 19(*b*) to 19(*d*) show maps for delay time of the gear transmission shift and throttle actuator respectively.
Figure 19B:
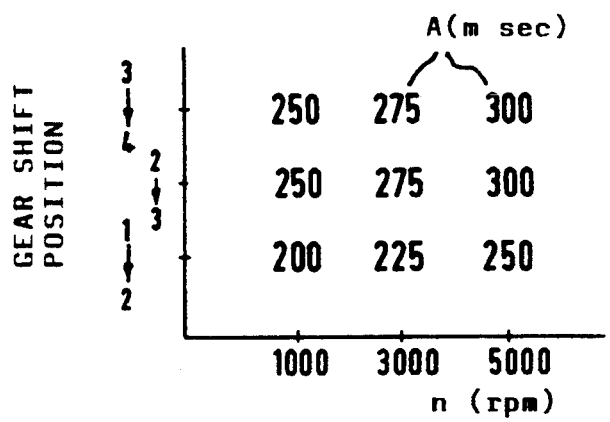
Figure 19C:
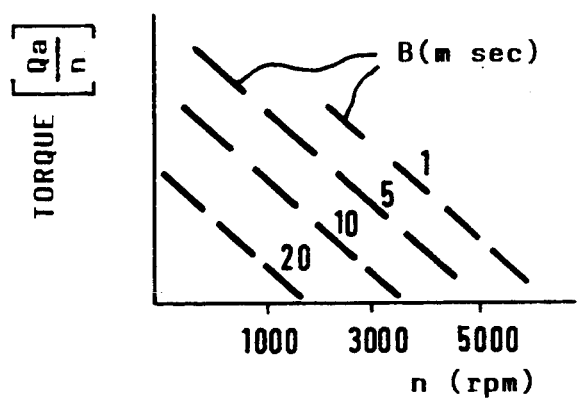
Figure 19D:
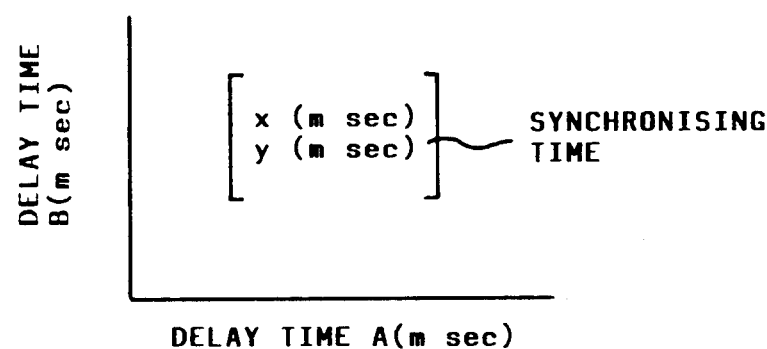

As shown in FIG. 19(a), the upper graphical representation shows the delay time A msec of the gear box transmission actuator in that there is a time delay between the actuator being instructed to perform a gear shift and the actuator actually performing the gear shift. Similarly there is a time delay B msec caused by delay in the throttle actuator supplying air $Q_a$. It will be noted that the time delay A and time delay B are different from one another. Because it is desired that the gear shift and throttle be actuated in synchronism with one another to provide a substantially jerk-free gear shift so the present invention sets a datum D from which the gear shift and throttle operations are actually performed so that a time x and time y are respectively required. As will be seen from the map of FIG. 19(b) which shows gear shift position with respect to engine rotational speed, the time delay A varies according to the gear shift being effected and the engine speed n. The time A is therefore retrieved from the map shown in FIG. 19(b). Similarly the delay time B is obtained from a map of $Q_a/n$ against engine speed n. Having secured data from the maps 19(b) and 19(c) the synchronising times x and y are retrieved from map 19(d) which is a map of delay time B against delay time A. It will therefore be understood from the above that the gear shift actuator and the throttle valve actuator are able to be operated in synchronism with one another to reduce gear change jerk.

The upper graph of FIG. 19(a) shows the gear shift signal SS and the actual time of gear shift GS which is effected after a time lag A. The lower graph of FIG. 19(a) shows a throttle signal TS and the time of actual change of the throttle signal, TC, occurring after a time delay B.

Figure 20:
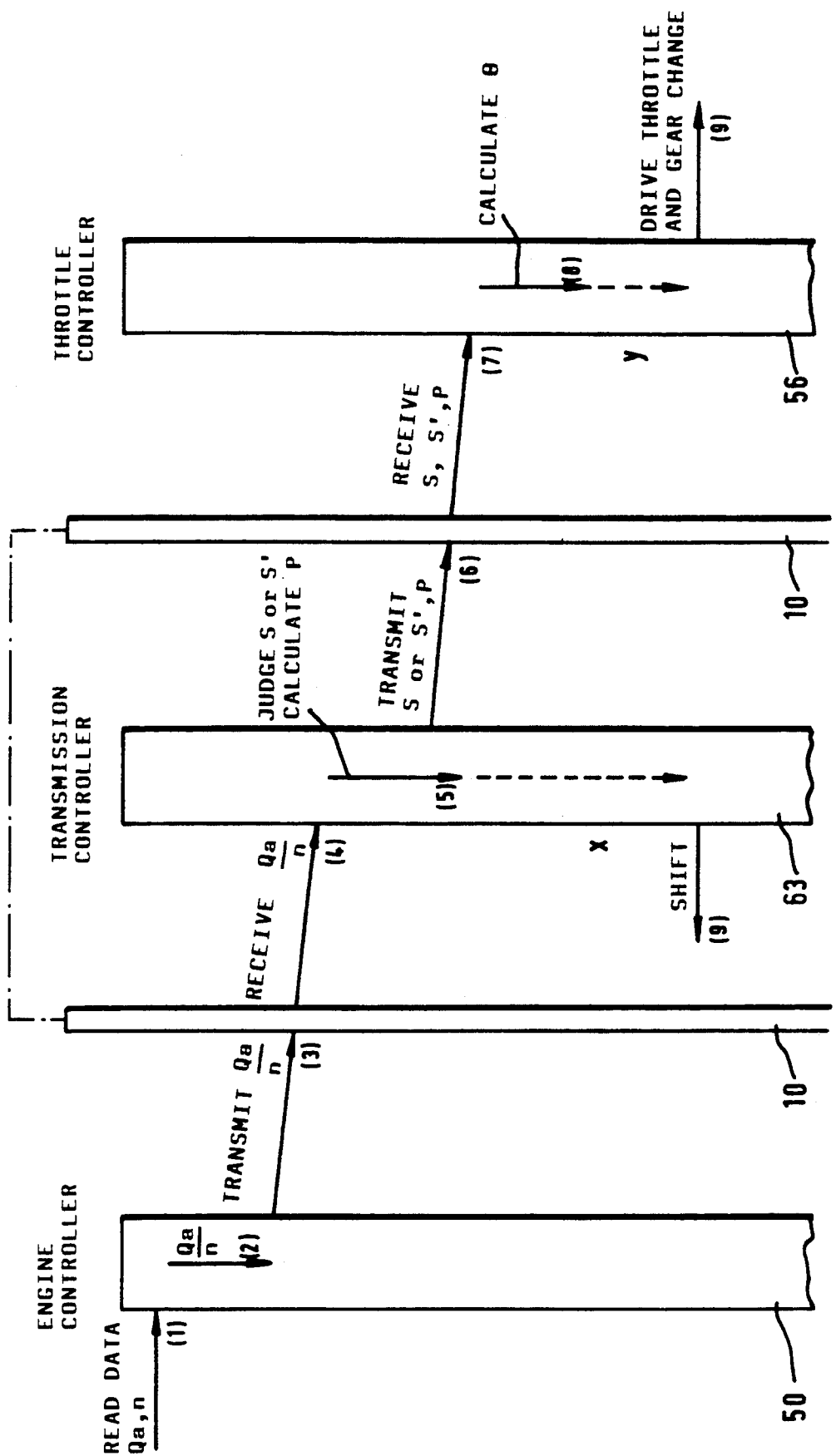
FIG. 20 shows the flow of data when effecting a gear shift.

FIG. 20 shows the flow of data for the above described operation. The controller 50 for controlling the engine detects (1) the amount of air $Q_a$ and the number n of engine revolutions and calculates (2) the load $Q_a/n$. Thereafter, the load $Q_a/n$ is transmitted (3) to the communication bus 10. The transmission controller 63 receives (4) the load $Q_a/n$ and judges whether a higher revolution speed shift or a lower revolution speed shift is necessary. After the judgment, the signal S or S' which corresponds thereto is calculated (5). When shift is necessary, the shift position P is also calculated (5). The signals S (or S') and P are transmitted (6) to the communication bus 10. The throttle controller 56 receives (7) these signals S (or S') and P and calculates (8) the throttle opening angle $\theta$. The controllers 56 and 63 wait for the time y and x respectively for synchonising the operations of the throttle and the transmission gear change and simultaneously control (9) the throttle actuator and the transmission gear change. In this way, in the gear changing operation, the two controlling operations are completely synchronised. The controllers 63 and 56 are supplied with data from the controllers 50 and 63, respectively, and synchronously cooperate for the same object and purpose of gear shifting on the basis of the data supplied. The timing for operation is also determined by the controllers 56 and 63.

An apparatus and a methed for suppressing the vibration of a vehicle body at the time of rapid acceleration and rapid deceleration by controlling the throttle opening angle, the damping force of the suspension and the height of the vehicle will now be explained.

Figure 21:
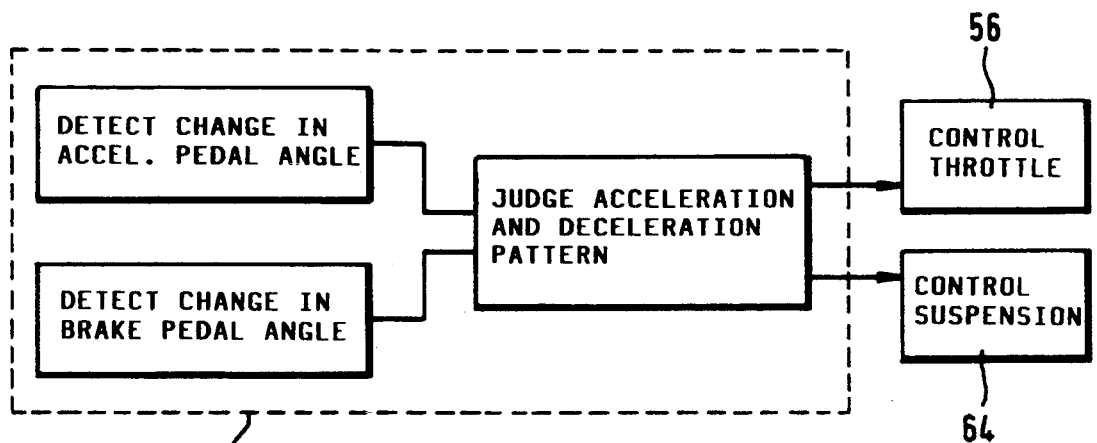
FIG. 21 schematically shows the controls of the engine, the throttle and the suspension.

FIG. 21 is a block diagram of such an apparatus. In order to judge whether or not there is a rapid acceleration or a rapid deceleration, a change in the accelerator pedal angle and a change in the brake pedal angle are detected. On the basis of these detections, the pattern of acceleration or deceleration is judged. These processings are carried out by the engine controller 50. In accordance with the judged pattern, the throttle opening angle and the suspension are controlled. The control variables for both are obtained on the basis of the signals from the engine controller 50 by the throttle controller 56 and the suspension controller 64, respectively, and given to the corresponding control units. In other words, the vibration of the vehicle body is cooperatively controlled by the controllers 56 and 64 on the basis of the data from the controller 50.

Figure 22:
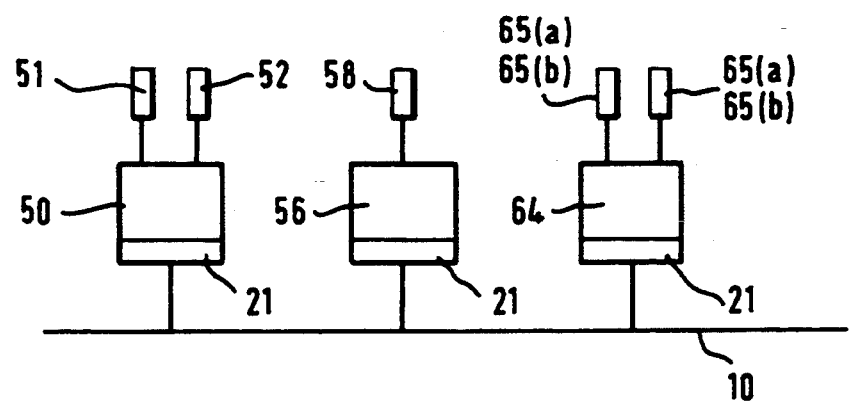
FIG. 22 shows the connection of controllers (computers) for effecting the operation of FIG. 21.

FIG. 22 shows the arrangement of the controllers 50, 56 and 64. Each controller is connected to the communication bus 10 through a respective communication device 21. The accelerator pedal opening angle sensor 51 and the brake pedal angle sensor 52 are connected to the engine controller 50. The throttle actuator 58 is connected to the throttle controller 56 and the vehicle height controller actuators 65(a) and the damping force controller actuators 65(b) are connected to the suspension controller 64. These three controllers cooperate with each other through the communication bus 10 to provide control for the same purpose, i.e. to control vehicle body vibration.

Figure 23:
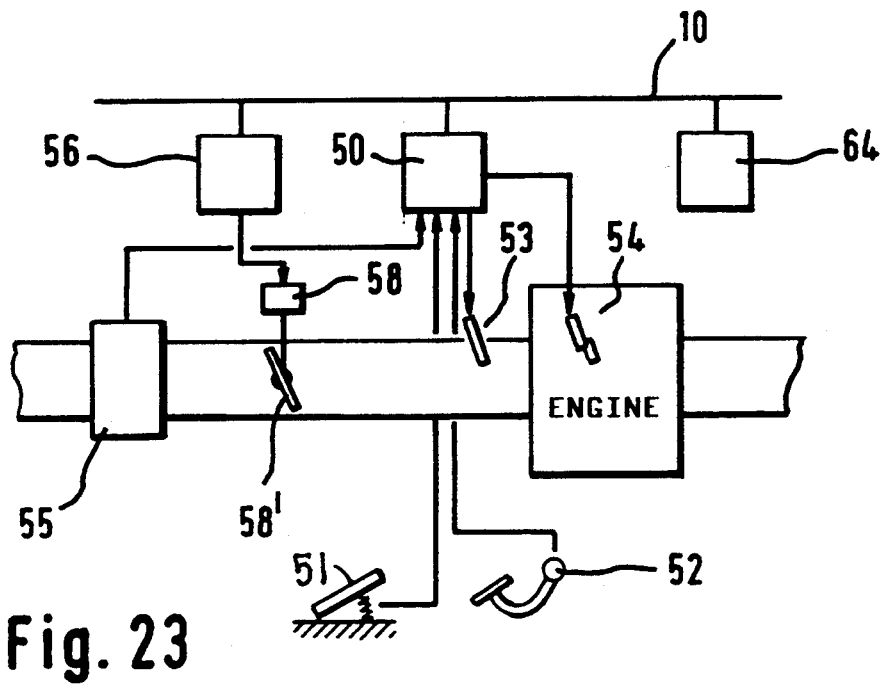
FIG. 23 schematically shows the structure of control for effecting the operation of FIG. 21.

FIG. 23 shows the structure of the hardware of the apparatus. The signals of the air flow meter 55, the accelerator pedal angle sensor 51 and the brake pedal angle sensor 52 are input into the controller 50. Signals are output from the controller 50 to the injectors 53 and the ignition plugs 54.

Figure 24:
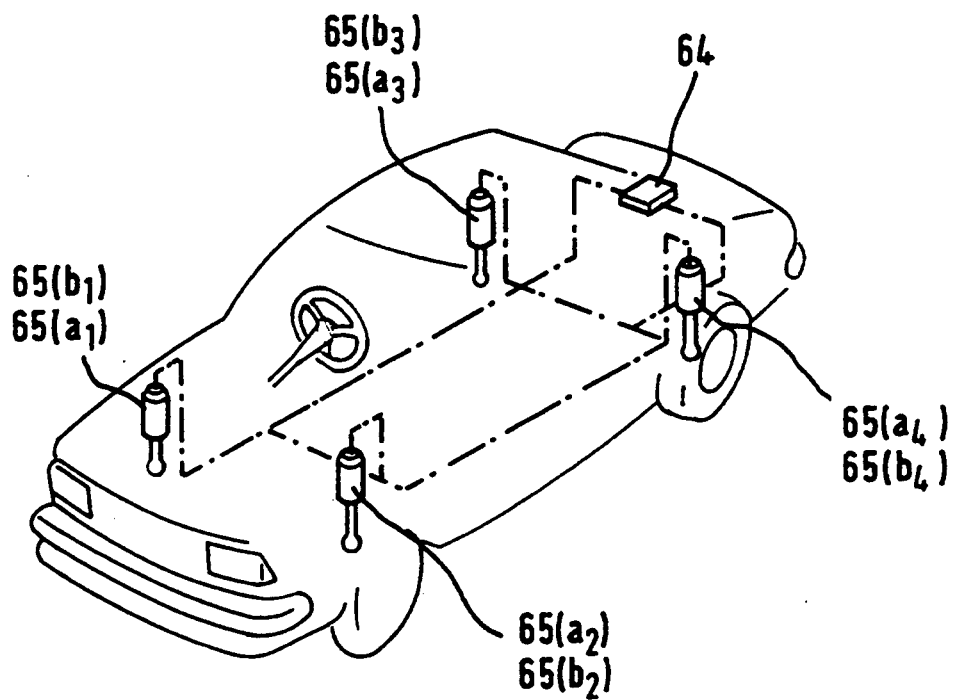
FIG. 24 shows the position of the automobile suspension.

The throttle 58' has an actuator 58 connected to the throttle controller 56. It is possible to control the actuators 65(a1) to 65(a4) and 65(b1) to 65(b4) shown in FIG. 24 independently of each other. For example, it is possible to increase only the height of the vehicle for the front wheels or only the height of the right wheels.

FIGS. 25(a) to (f) are time sequential graphs showing the control operation of each element during rapid acceleration. If the throttle opening angle is operated in proportion to the angle of the accelerator pedal (FIG. 25(a)), as indicated by the broken line in FIG. 25(b), without controlling the suspension, the vibration of the vehicle body greatly fluctuates, as shown by the broken line in FIG. 25(f).

In contrast, if the throttle is controlled in accordance with a certain pattern as indicated by the solid line in FIG. 25(b) and each actuator is so controlled that the vehicle body leans slightly forward as shown by FIGS. 25(c) and 25(d), the vibration of the vehicle body is reduced, as indicated by the solid line in FIG. 25(f). At this time, the damping force of the suspension, shown in FIG. 25(e), is set at a slightly increased value. The operational pattern of the throttle is determined by the variation $\Delta\theta_{ac}$ in the accelerator pedal angle. The pattern can be changed by varying the operation starting time x and the angular amount y of operation, as shown in the throttle opening angle in FIG. 25(b). The values x and y are held in memory and determined in accordance with the value of $\Delta\theta_{ac}$.

FIGS. 26(a) to (f) are time sequential graphs showing the control operation of each element during rapid deceleration. Whether or not there is a rapid deceleration is detected from, for example, the variation $\Delta\theta_{Br}$ of the brake pedal angle, as shown in FIG. 26(b). At this time, the acceleration pedal angle is of course reduced, as shown in FIG. 26(a). In the case of rapid deceleration, the vehicle body leans forwardly. In order to prevent this, the height of the vehicle is so controlled as to be slightly higher for the front wheels relative to that for the rear wheels indicated by FIGS. 26(e) and (d) respectively. The damping force is also set at a slightly increased value, as shown in FIG. 26(e). Owing to this control, the vibration of the vehicle body changes as indicated by the solid line in FIG. 26(f). Without any control, the vehicle body vibrates as indicated by the broken line in FIG. 26(f), which thus demonstrates the effect of the control.

Figure 27:
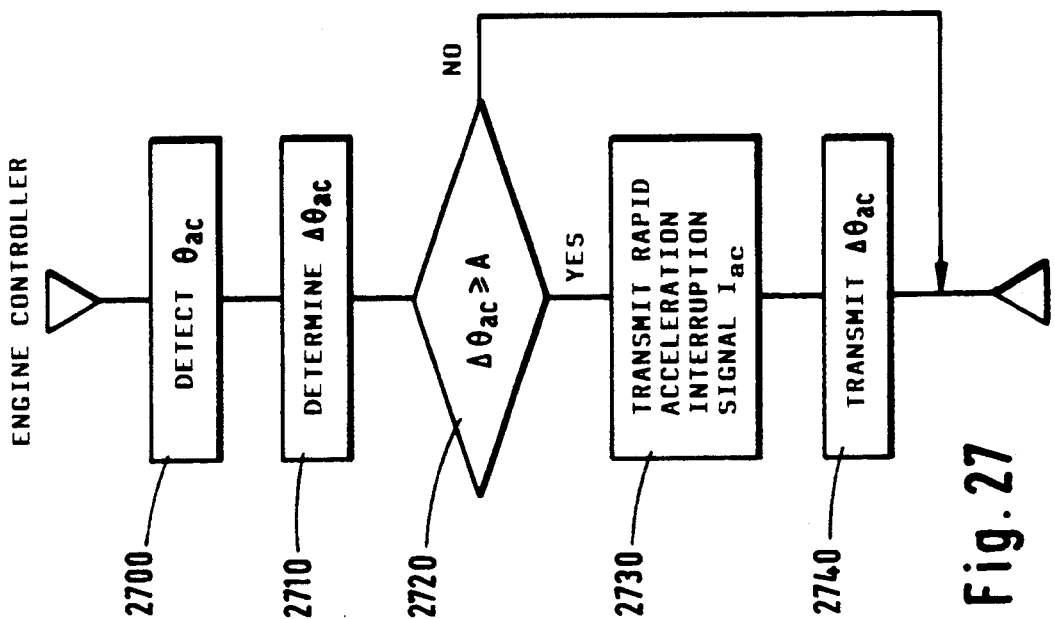

FIG. 27 shows the flowchart of these controls.

As shown in FIG. 27, the engine controller 50 obtains the variation $\Delta\theta_{ac}$ of the accelerator pedal angle at the steps 2700 and 2710. If the variation is not less than a reference value (A), it is judged that there is a rapid acceleration at the step 2720. In the case of a rapid acceleration, a rapid acceleration interruption signal $I_{ac}$ is transmitted to the other two controllers 56 and 64 at the step 2730. At the step 2740, the variation $\Delta\theta_{ac}$ is also transmitted.

Figure 28:
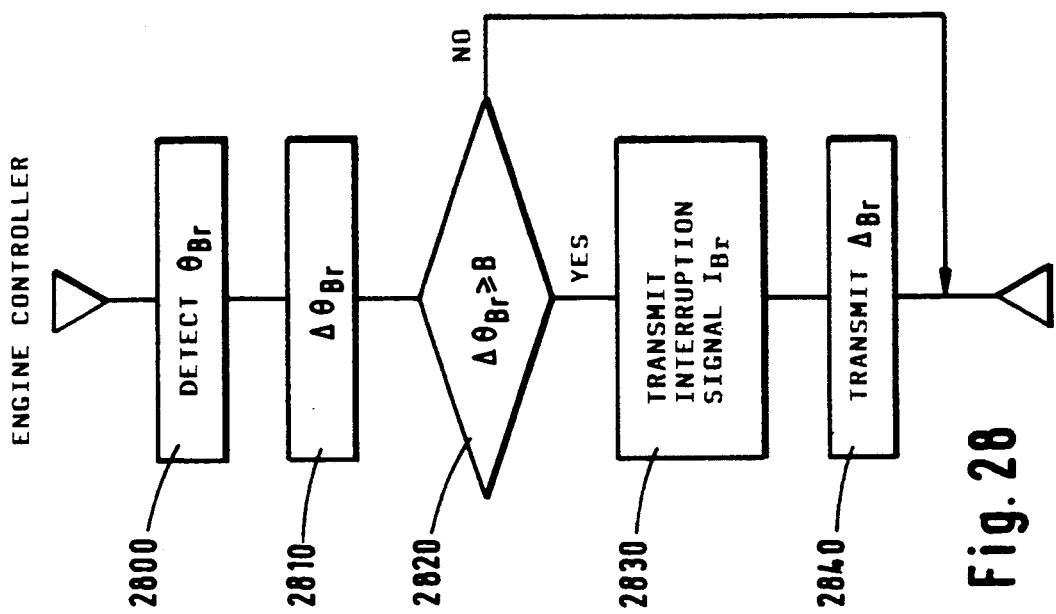
FIGS. 27 to 30 are flowcharts for controllers during acceleration and deceleration.

On the other hand, in the case of detecting a sudden deceleration, as shown in FIG. 28, the brake pedal angle $\theta_{Br}$ is detected at the step 2800 and $\Delta\theta_{Br}$ is obtained at the step 2810. If $\Delta\theta_{Br}$ is judged to be not less than the reference value B at the step 2820, a sudden deceleration interruption signal $I_{Br}$ is transmitted at the step 2830. At the step 2840, $\Delta\theta_{Br}$ is also transmitted.

Figure 29:
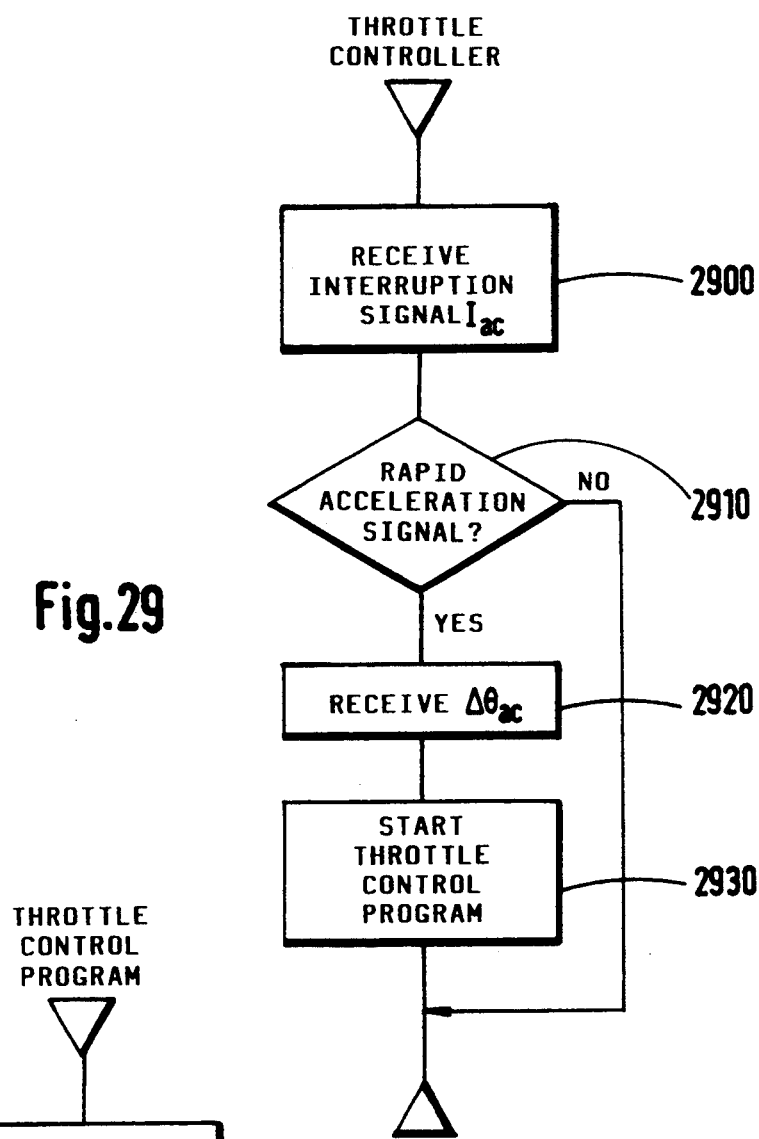

FIG. 29 is a flowchart for the throttle controller 56. Whether or not the interruption signal $I_{ac}$ has been received is determined at the step 2900, and whether or not there is a rapid acceleration signal is judged at the step 2910. If there is a rapid acceleration signal, $\Delta\theta_{ac}$ is also received at the step 2920. Thereafter, a throttle control program at the time of rapid acceleration is started at the step 2930.

Figure 30:
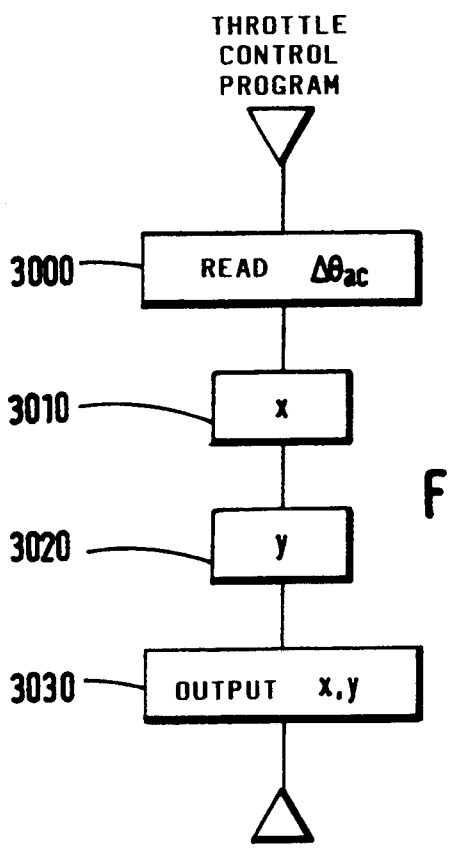
Figure 31:
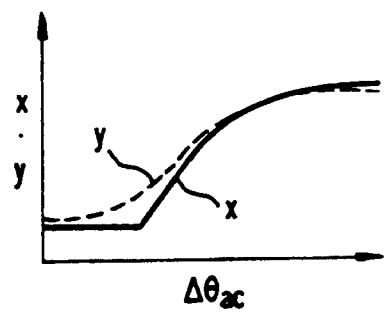
FIG. 31 is a characteristic curve of values retrieved from memory.

FIG. 30 shows the throttle control program at the time of rapid acceleration. $\Delta\theta_{ac}$ is first read at the step 3000. The values of x and y shown in FIG. 25(b), held in memory, correspond to the value of $\Delta\theta_{ac}$, as shown in, for example, the map of FIG. 31 and are retrieved at steps 3010 and 3020. The values of x and y are outputted to the actuator at the step 3030, for the throttle control.

Figure 25:
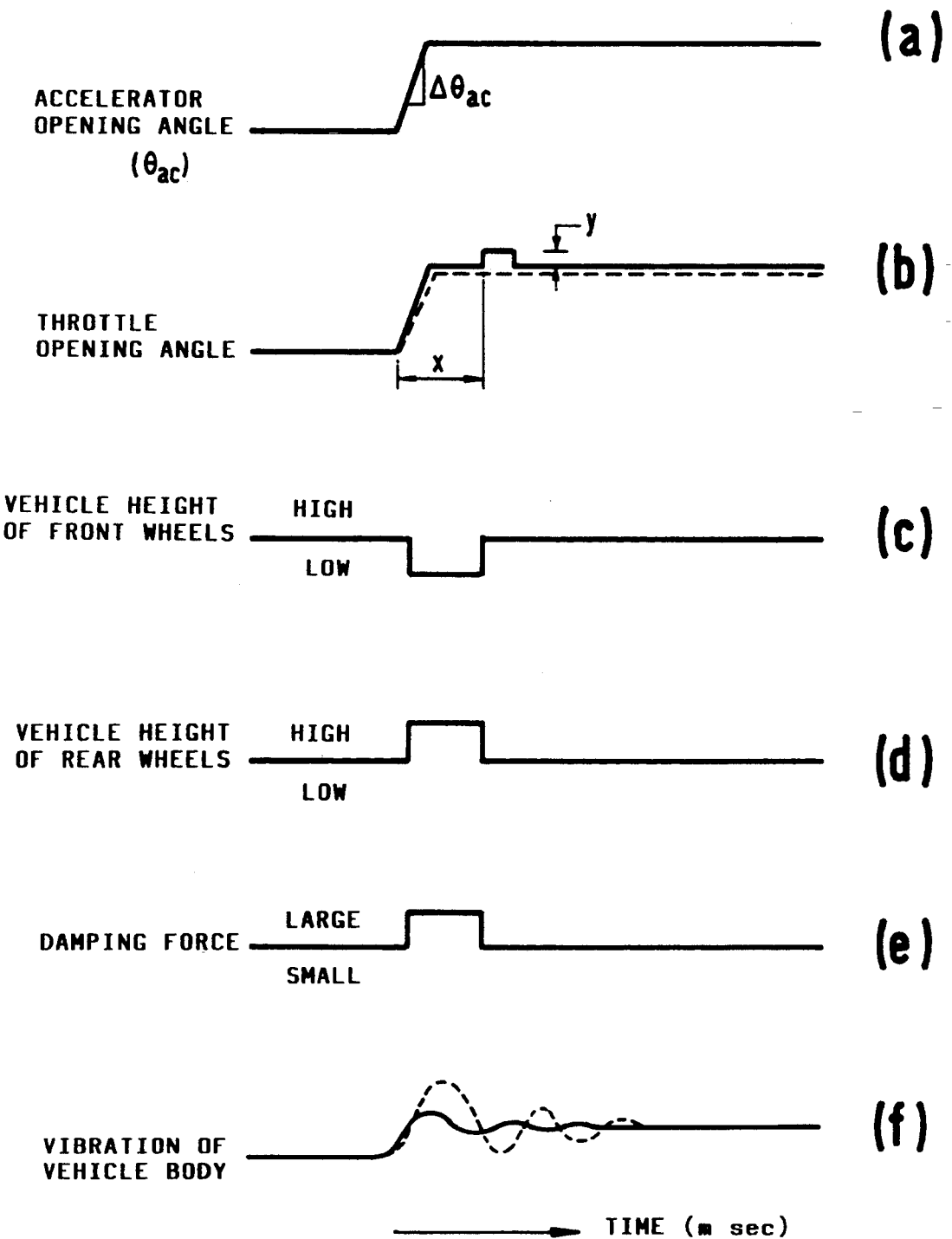
FIGS. 25 and 26 are characteristic curves of the automobile when accelerating and decelerating.
Figure 26:
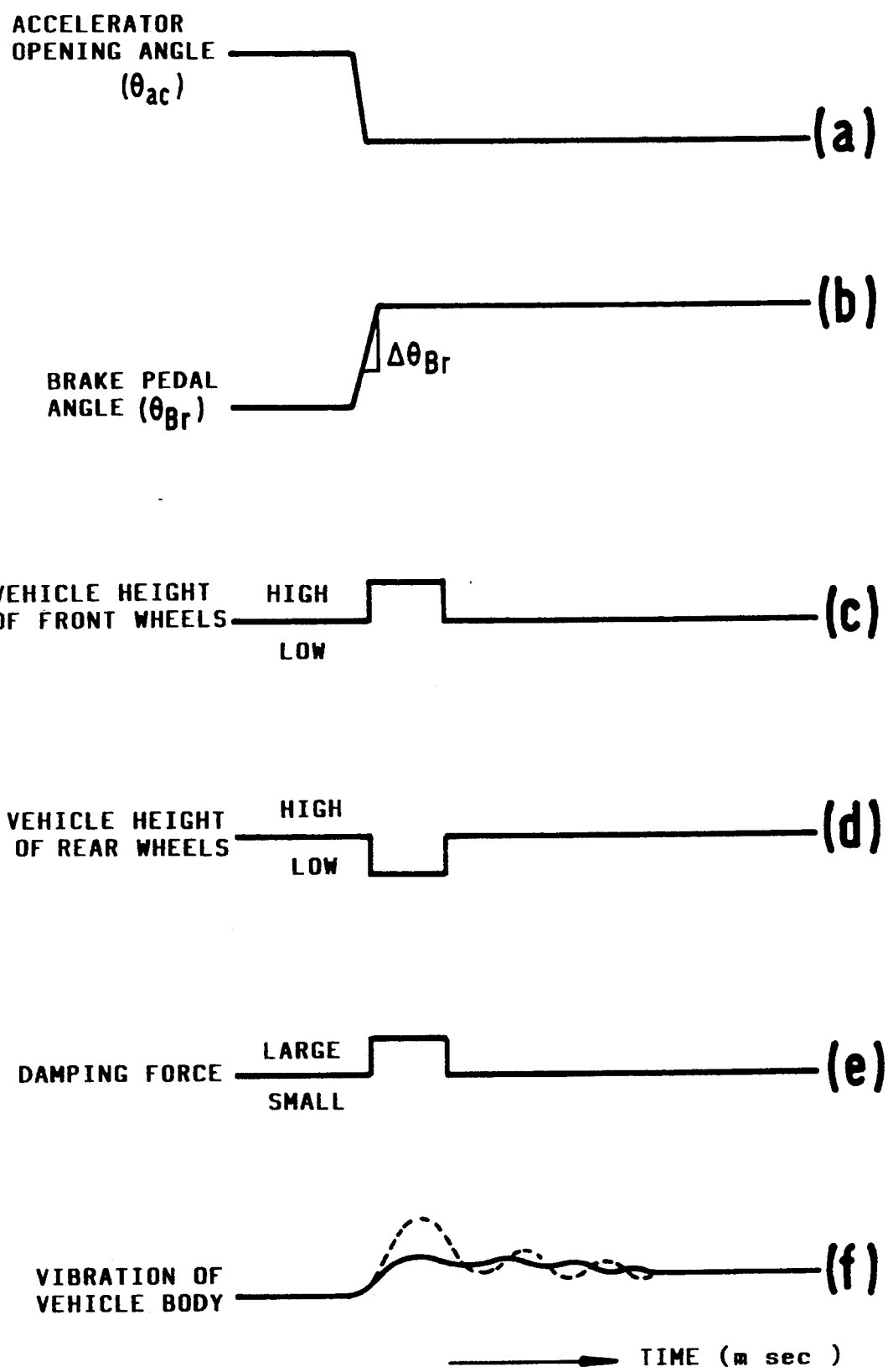
Figure 32:
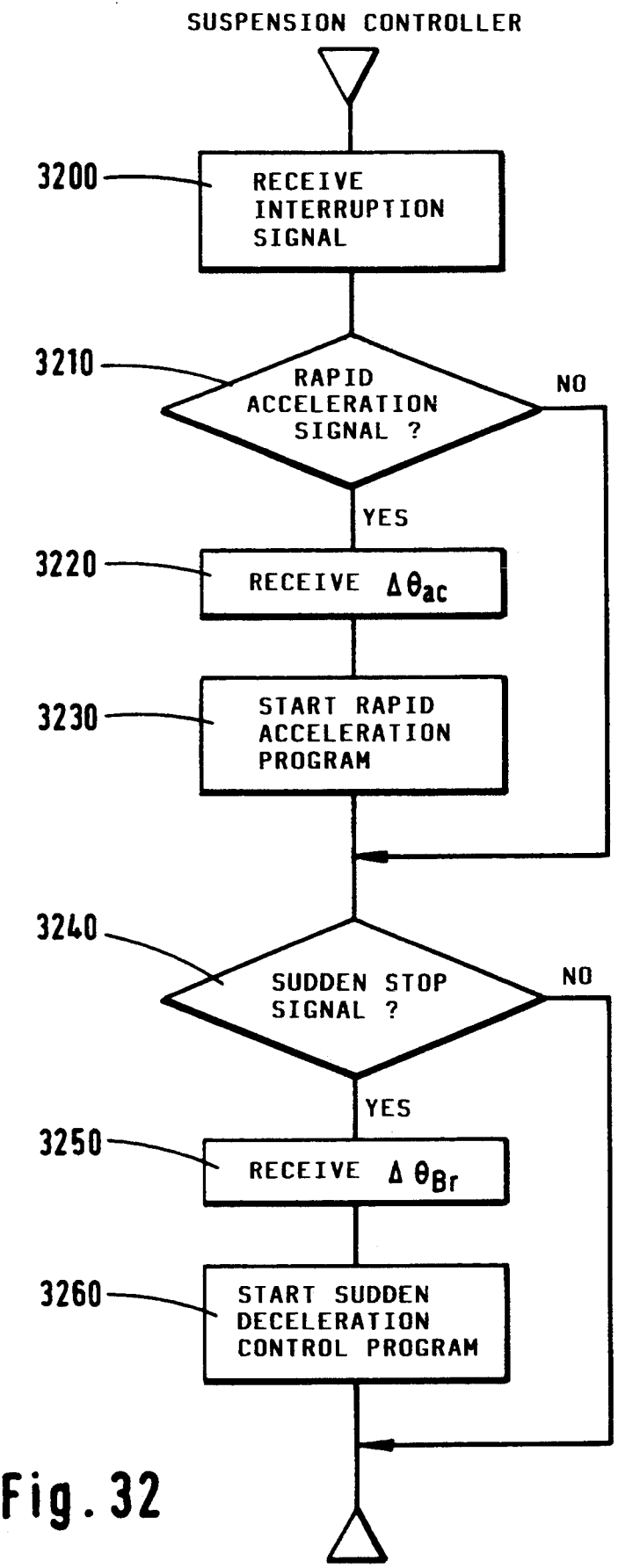
FIG. 32 is a flowchart for a suspension controller.

FIG. 32 is the flowchart for the suspension controller. If an interruption signal is received at the step 3200 and if it is judged at the step 3210 that a rapid acceleration signal is received, $\Delta\theta_{ac}$ is also received at the step 3220. In accordance with this signal, the rapid acceleration control program for controlling the height of the vehicle body and the damping force is started at the step 3230, as shown in FIG. 25. On the other hand, if the interruption signal is judged as a sudden deceleration signal at the step 3240, $\Delta\theta_{Br}$ is received at the step 3250. In accordance with this signal, the program for controlling the height of the vehicle and the damping force is started at the step 3260, as shown in FIG. 26.

Figure 33:
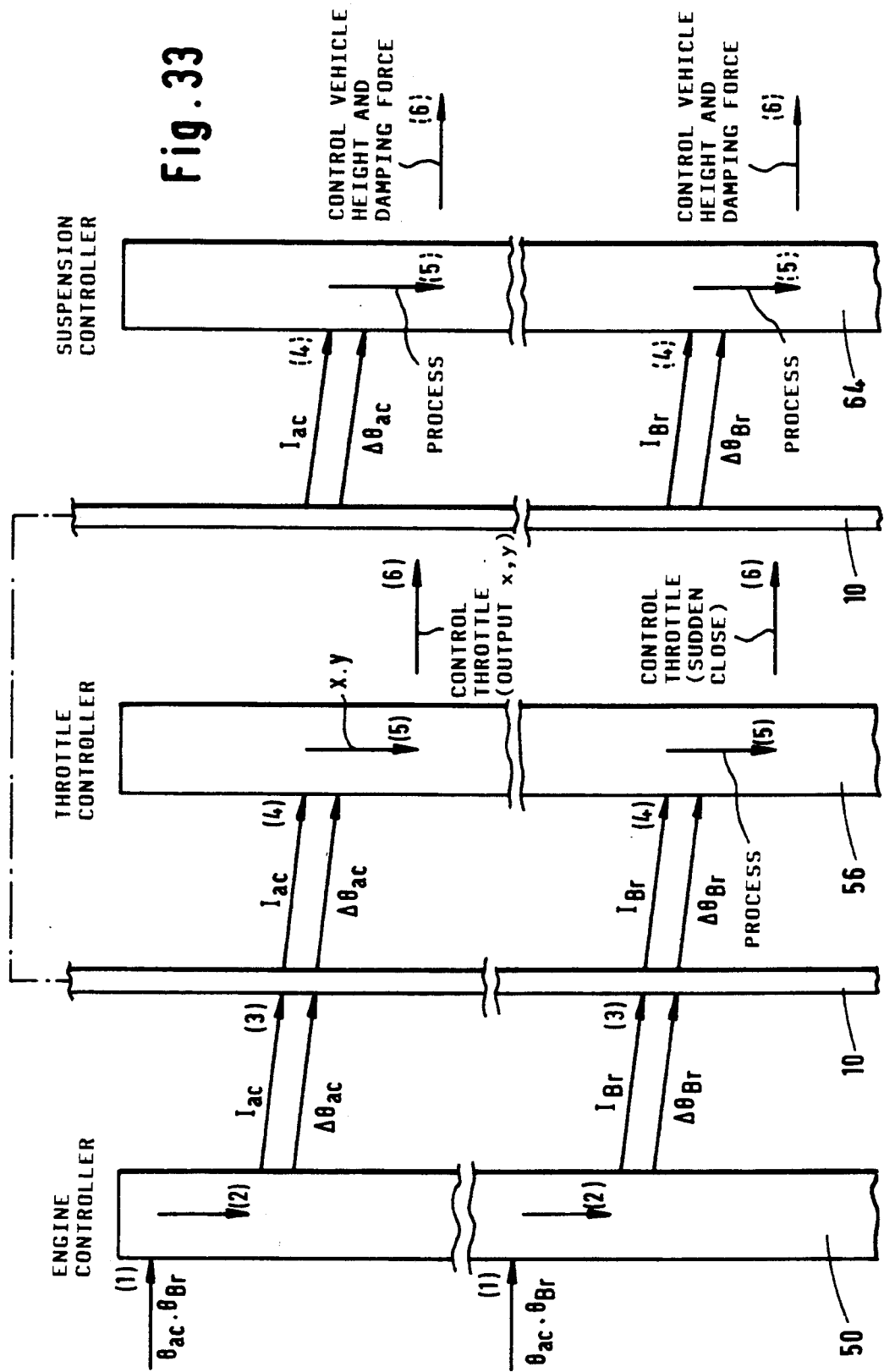
FIG. 33 shows the flow of data between three controllers including the suspension controller.

FIG. 33 shows the flow of data between the controllers 50, 56 and 64 in serial time. The controller 50 detects (1) $\theta_{ac}$ and $\theta_{Br}$ and judges (2) whether there is a rapid acceleration or a sudden deceleration. In the case of a rapid acceleration, an interruption signal $I_{ac}$ is transmitted (3) and $\Delta\theta_{ac}$ is also transmitted (3). When the interruption signal $I_{ac}$ is received (4), the controllers 56 and 64 substantially synchronously both receive (4) $\Delta\theta_{ac}$ and judge (5) the angle of $\Delta\theta_{ac}$ so as to determine the controlled variables such as x, y and the height of the vehicle and the damping force respectively. These values are output (6) to each control unit.

In the case of a sudden deceleration, if the controller 50 detects (1) and judges (2) that there is a sudden deceleration, an interruption signal $I_{Br}$ is transmitted (3). $\Delta\theta_{Br}$ is also transmitted (3). The subsequent procedures for the suspension controller are similar to (but effectively the reverse of) the case of a rapid acceleration. In the case of a sudden deceleration, the throttle controller 56 outputs a command for rapidly closing the throttle (6).

The cooperative control of the torque detecting controller 61, the transmission controller 63 and the engine controller 50 will now be explained.

Figure 34:
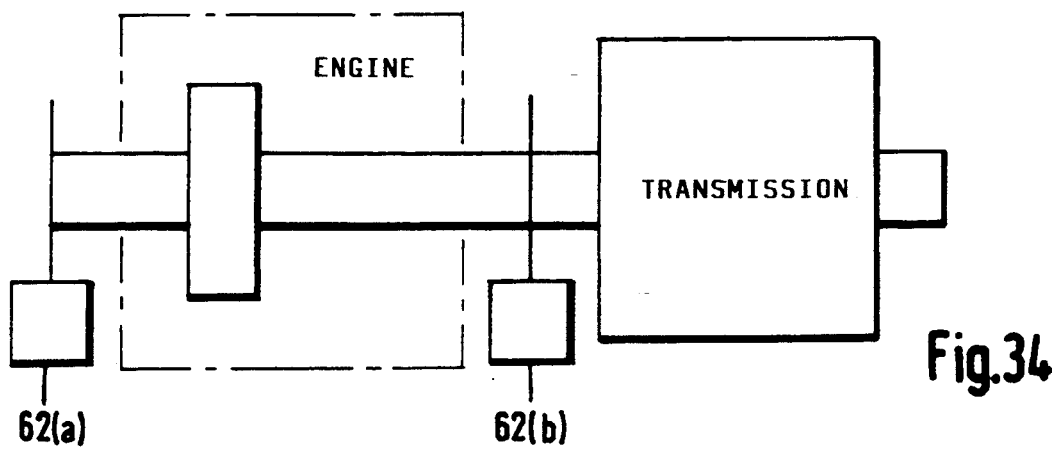
FIG. 34 is a schematic view of a torque detection device.

In FIG. 34, it is assumed that the torsion angles of crankshaft torsion angle detectors 62(a) and 62(b) are $\theta_1$ and $\theta_2$ respectively, and the torque $T_r$ of the crankshaft is represented by the following formula:

$$T_r = k_1 (\theta_1 - \theta_2)$$

wherein $k_1$ represents a proportionality factor.

If the engine torque generated is assumed to be $T_E$, the following relationship holds between $T_E$ and T:

$$T_E - T_r = I \frac{d^2\theta_1}{dt^2}$$

wherein I represents a proportional constant.

From these formulae, the following formula holds:

$$T_E = I \frac{d^2\theta_1}{dt^2} + k_1(\theta_1 - \theta_2)$$

It is therefore possible to obtain $T_E$ by measuring $\theta_1$ and $\theta_2$.

The crankshaft rotational speed $\omega$ is inversely proportional to the period of the crankshaft angle pulse. It is therefore possible to obtain the rotational speed $\omega$ by measuring the period of the angle pulse.

Figure 35:
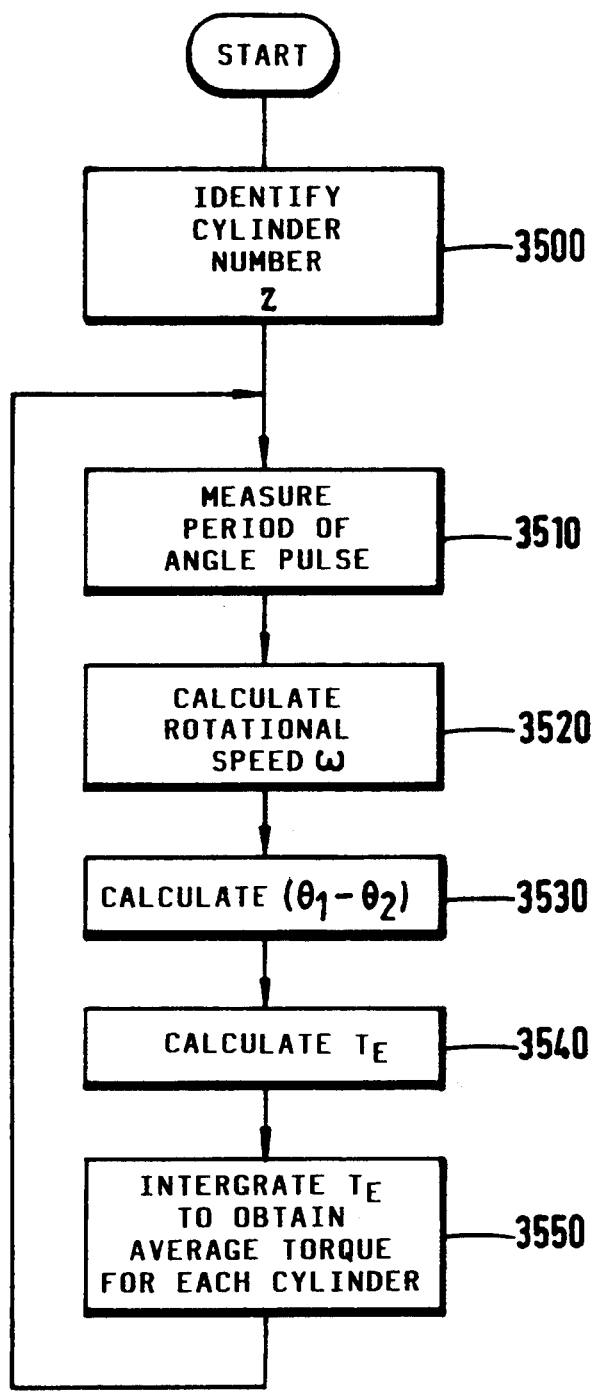
FIG. 35 is a flowchart for calculating average engine torque.

An example of execution of the above calculations is shown in FIG. 35.

In the case of a four-cylinder engine, two strokes of expansion and hence ignition are produced per rotation of the crank shaft. It is necessary to identify the cylinder which generates torque at this time. This can be identified from the position of the camshaft. At the step 3500 in FIG. 35, the cylinder number Z is identified. When the cylinder 1 is in the explosion stroke, it is assumed that Z=1. At the step 3510, the period of the angle pulse is measured. The rotational speed $\omega$ is next calculated at the step 3520. $(\theta_1-\theta_2)$ is then calculated at the step 3530. At the step 3540, $T_E$ is calculated, and the values of $T_E$ are integrated during the explosion stroke and the average value of the torque $\Delta T_E$ of each cylinder is obtained at the step 3550.

Figure 36:
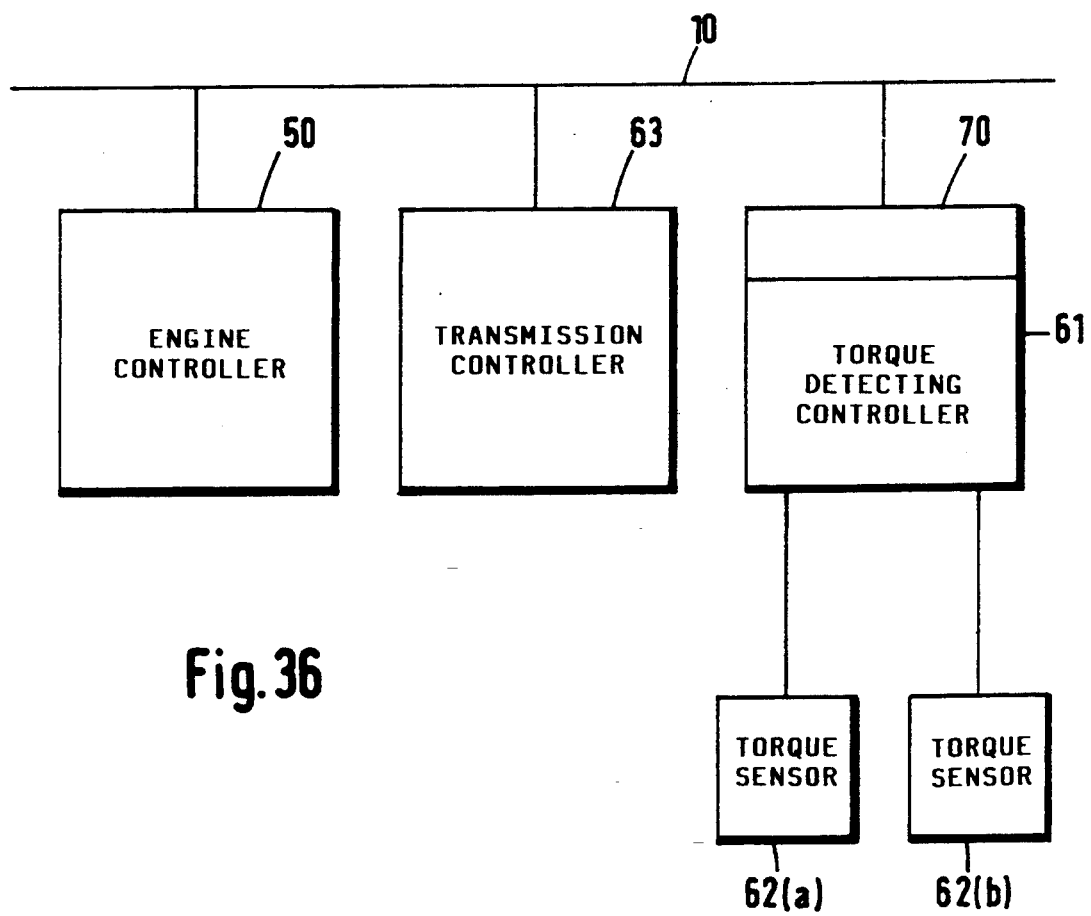
FIG. 36 shows the connection between the serial communication controllers (computers) for the engine and the transmission.

A block schematic of the hardware is shown in FIG. 36. The serial communication bus 10 is connected to the engine control unit 50 and the transmission control unit 63. These control units require engine torque information. The engine torque information is obtained by the torque detecting controller 61, and is transmitted from an LSI 70 for serial transmission to the control units 50 and 63 through the communication bus 10. The detectors 62(a) and 62(b) are connected to the controller 61, which executes the calculations in the flowchart shown in FIG. 35 so as to obtain the information on the engine torque.

The control unit 50 adjusts the throttle valve opening angle on the basis of the information and so controls the engine torque generated as to be the target value. The control unit 63 switches the gear box transmission on the basis of the information on the torque.

FIG. 37 shows the flow of data.

The engine controller reads (1) the signal of the crank angle sensor and judges (2) the cylinder. The cylinder judging signal $Z_1$ (cylinder 1) is transmitted (3) to the communication bus 10. The torque detecting controller 61 receives (4) $Z_1$. The controller 61 also integrates the torques generated during the explosion stroke so as to obtain (5) $T_E$ and $\Delta T_E$. $T_E$ and $\Delta T_E$ are transmitted (6). The engine controller 50 receives (7) $T_E$ and $\Delta T_E$, compares (8) these with the target torque so as to calculate the throttle opening angle. The throttle opening angle is output (9) to the throttle actuator and the results of the calculations for the amount of fuel and ignition timing are output (10) to the injector and the ignition circuit respectively.

The transmission controller 63 receives (7') $T_{E1}$ and so determines (8') the transmission gear ratio that the target torque generates. The determined gear ratio is output (9') to the transmission and a gear shift is performed, if necessary.

In this embodiment, the controllers 50 and 63 cooperate with each other for the control of the gear shift on the basis of, the results of the calculations of the torque detecting controller 61.

Thus, from determination of the generated torque by the controller 61, the controllers 50 and 63 cooperate with each other.

The cooperation for the control of engine knocking (predetonation) will now be explained.

Figure 38:
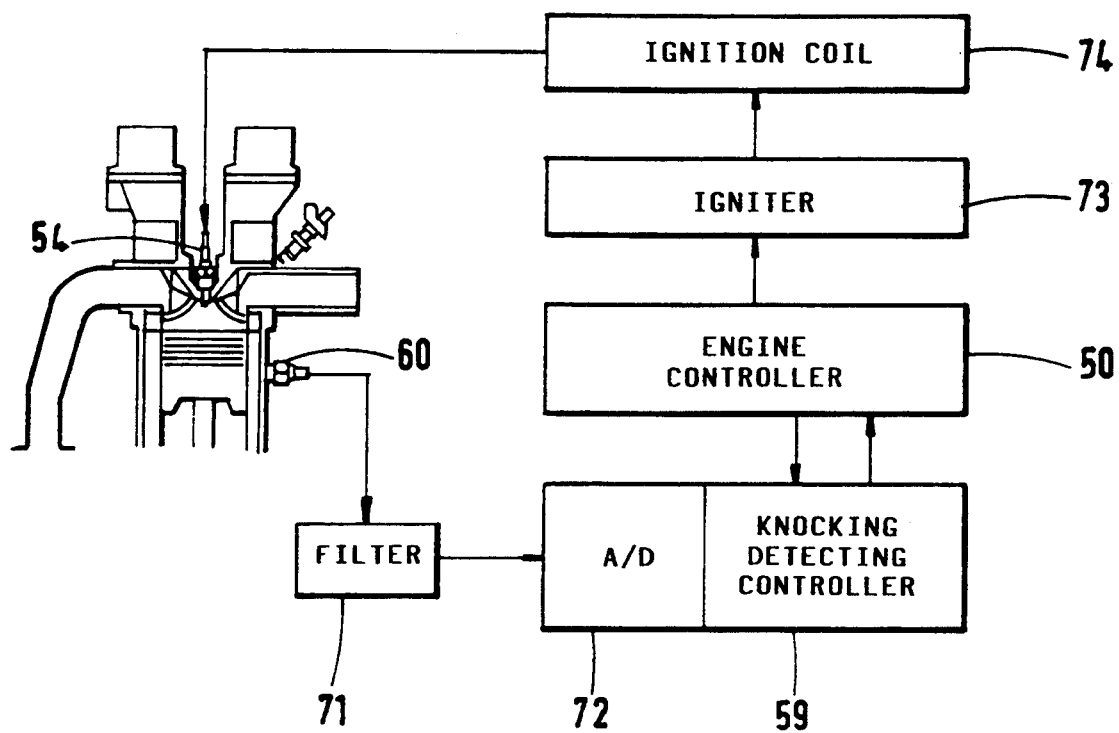
FIG. 38 is a schematic view of a knocking controlling device.

FIG. 38 schematically shows an example of the engine knocking control system. The knocking produced in the engine is electrically detected by the knocking sensor 60 mounted on the cylinder block of the engine, and the signal is input into the knocking, detecting controller 59 via a filter 71 and an A/D converter 72 to judge the intensity level of the knocking. The engine controller 50 obtains a predetermined ignition timing for not causing knocking by calculation based on the results of the judgment of the knocking, and controls an igniter 73. In accordance with the ignition signal output from the igniter 73, high voltage ignition energy is supplied from an ignition coil 74 to the ignition plug 54 for ignition at a predetermined ignition timing. Knocking is prominently caused by pre-detonation, i.e. firing occurs at a position ahead of the top dead centre (tdc) of the piston, namely, on the advanced side of tdc. Therefore, in the knocking control method, the knocking is suppressed by delaying the ignition timing when knocking is detected.

Figure 39:
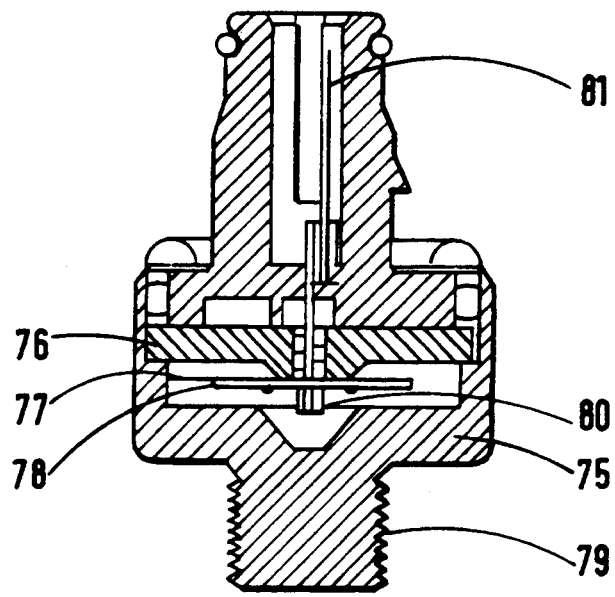
FIGS. 39 to 42 are sectional views of knocking sensors.

Various knocking sensors are proposed. The sensor shown in FIG. 39 is used for the system shown in FIG. 38 and is generally called an engine block wall vibration detection type sensor known per se. A vibration plate 77 is attached to a base plate 76 in a housing 75 and a piezoelectric element 78 is fixed on the surface of the vibration plate 77. The sensor is mounted on the cylinder block of the engine by an external screw thread 79 of the housing 75. The vibration caused by knocking is transmitted to the base plate 77, and the vibration plate 77 is designed so as to resonate in the vicinity of the frequency of knocking (in the vicinity of about 7 kHz). The torsional force caused by the resonant vibration is received by the piezoelectric element 78 and the vibration amplitude of the electric signal which is proportional to the magnitude of the vibration is output from the piezoelectric element 78 via a terminal 81 and a lead terminal 80.

Figure 40:
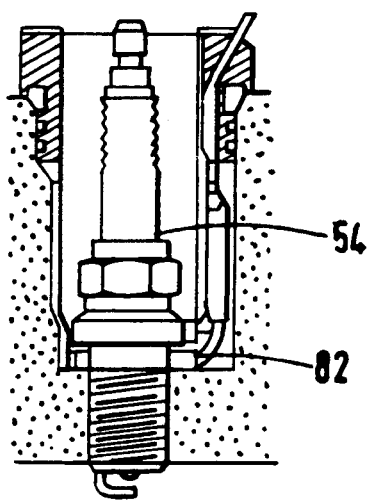
Figure 41:
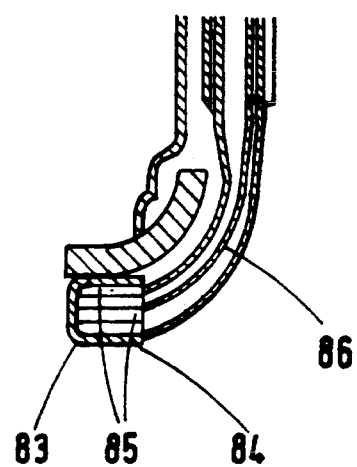

FIG. 40 schematically shows a washer type cylinder pressure detection type knocking sensor. The sensor body is disposed on a washer portion 82 of the ignition plug 54. The sensor is mounted on the cylinder head. A part of the sensor body is shown in cross-section in FIG. 41. A piezoelectric element 84 is disposed within a case 83 and electrodes 85 are provided on surfaces thereof so as to connect the sensor to a 3-lead wire cable 86.

When cylinder pressure is applied to the ignition plug 54, the plug is lifted to reduce the load applied to the piezoelectric element 84 and, from the charge generated by the piezoelectric element cylinder, pressure is detected. When knocking is caused, a high-frequency signal component is overlapped with the cylinder pressure. The knocking is detected by the high-frequency signal component.

Figure 42:
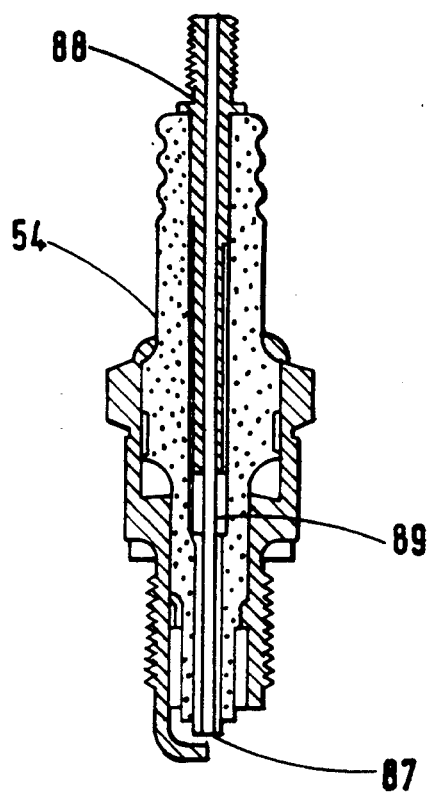

FIG. 42 is a sectional view of the main part of a combustion light detection type knocking sensor known per se. A silica glass fiber 89 is provided in such a manner as to penetrate a central electrode 87 and the high-voltage terminal 88 of the ignition plug 54. The light produced by the flame of combustion is detected and by subjecting the light to optical and electrical processing knocking is detected. When knocking is caused, a high-frequency signal component is overlapped onto the wave form of the light intensity caused by combustion, and the knocking is detected by determining the high-frequency component.

Other types of knock sensors are known, e.g. pressure type sensors using a crystal or the like, ion current detection type sensors for detecting a change in the ion current, etc.

When an engine is driven in a high-load state, a portion which is excessively heated, namely, a hot spot is apt to be produced in the combustion chamber. The hot spot portion tends to be produced at the leading edge in the direction of propagating a flame in the explosion (power) stroke, what is termed in the art as the end gas portion. Knocking is the phenomenon of spontaneous combustion produced at the hot spot of the end gas portion which travels between opposing walls of the combustion chamber at a sonic speed as a shock wave, and is repeatedly reflected between the cylinder walls so as to cause a pressure vibration in the combustion chamber at a high speed.

Therefore, when knocking is produced, the shock wave produces bump sound with the cylinder wall surface, and if knocking is further increased, the temperature of the hot spot may be raised so much as to melt the piston and/or the cylinder, thereby seizing the engine.

In modern high-reving, high-compression ratio and high-output engines, knocking has a higher tendency to be produced and the control for suppressing knocking has become important.

As described above, knocking appears as a pressure vibration caused by the shock wave which moves at sonic speed in the combustion chamber. It is known that the vibration frequency is a function of the sonic speed C in the combustion chamber and the diameter B of the cylinder bore and that the intrinsic vibration frequency $f_R$ is represented by the following formula:

$$f_R = \frac{C}{\pi B} \rho mn$$

wherein $\rho mn$ represents a function determined by the cylinder vibration mode. In a general engine, $f_R$ is given by the frequency mode $f_{10}$=about 7 kHz and $f_{20}$=about 13 kHz. Because knocking is a high-speed phenomenon so a high-speed arithmetic processing portion is necessary in order to detect and process knocking.

Figure 43:
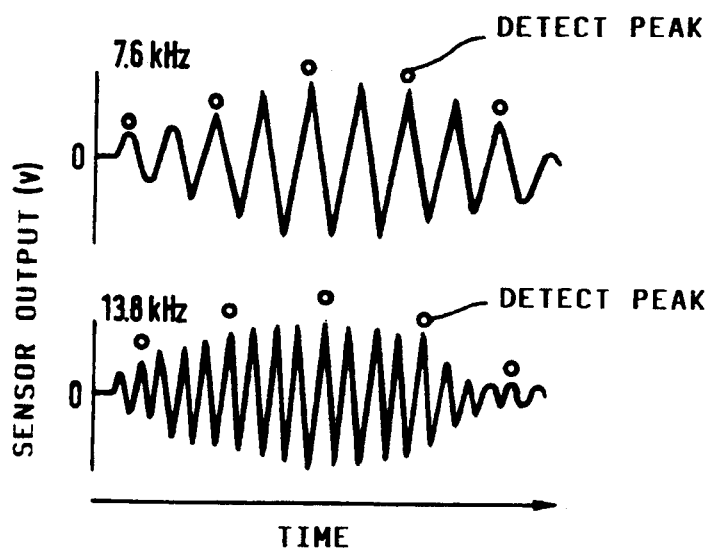
FIGS. 43 and 44 show the wave forms of the signals of the knocking sensors.

FIG. 43 shows the wave forms of two special intrinsic vibration frequency components extracted by a band pass filter from the signals detected by the above-described engine block wall vibration detection type sensor of FIG. 39. These knock signal wave forms are extracted for one cycle of the knocking phenomenon. It is desirable that the knocking detecting controller 59 shown in FIG. 38 samples the output wave form at, for example, 15 msec intervals and detects the peak value thereof.

Figure 44:
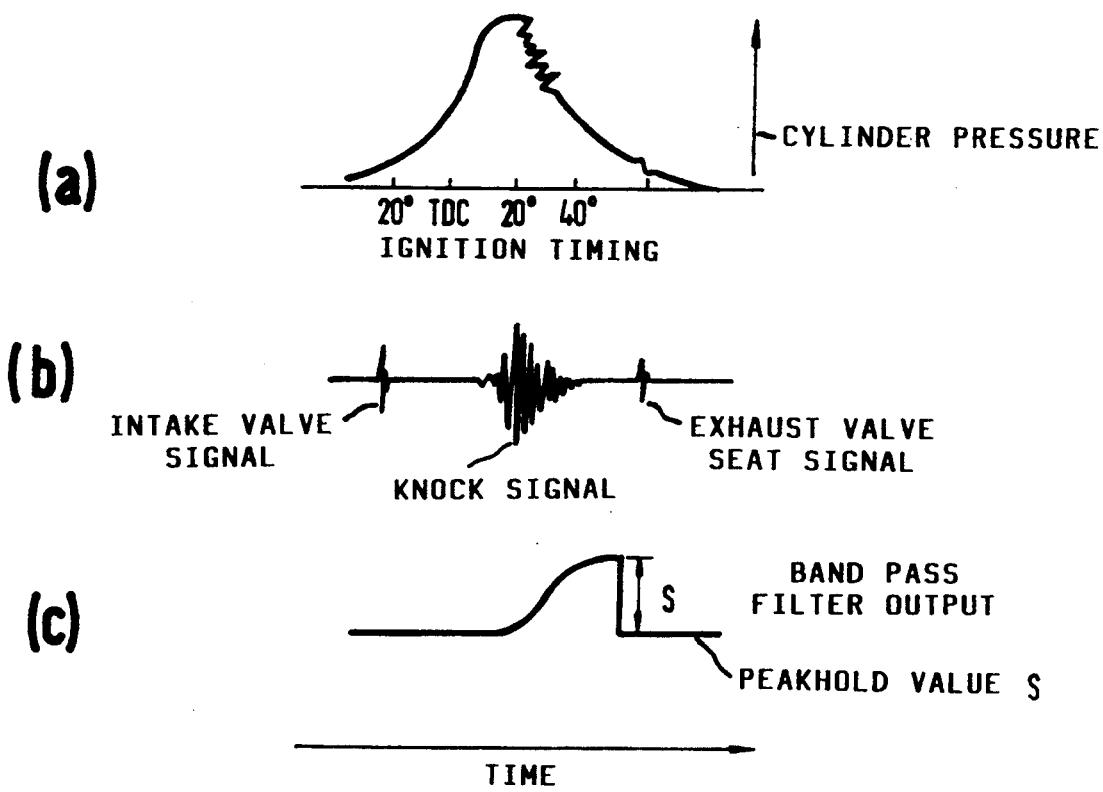

FIG. 44 shows signal wave forms detected by the above-described pressure detection type sensor. FIG. 44(a) shows a graphical representation having an abscissa of ignition timing against an ordinate of cylinder pressure in which it will be noted that the cylinder pressure is greatest at 20° after TDC. Following peak pressure at ignition there is a high frequency knocking component superimposed on the explosion frequency as indicated on the negative going part of the way for after peak pressure. FIG. 44(b) shows the vibration signals caused by the intake valve, the knocking signal and the exhaust valve seat respectively. FIG. 44(c) shows the output of a band pass filter through which the output signals of the knocking sensors have been applied and the peak value S is effectively a summation of the peak components shown in FIG. 43.

The knocking detection controller will now be more fully explained.

Figure 45:
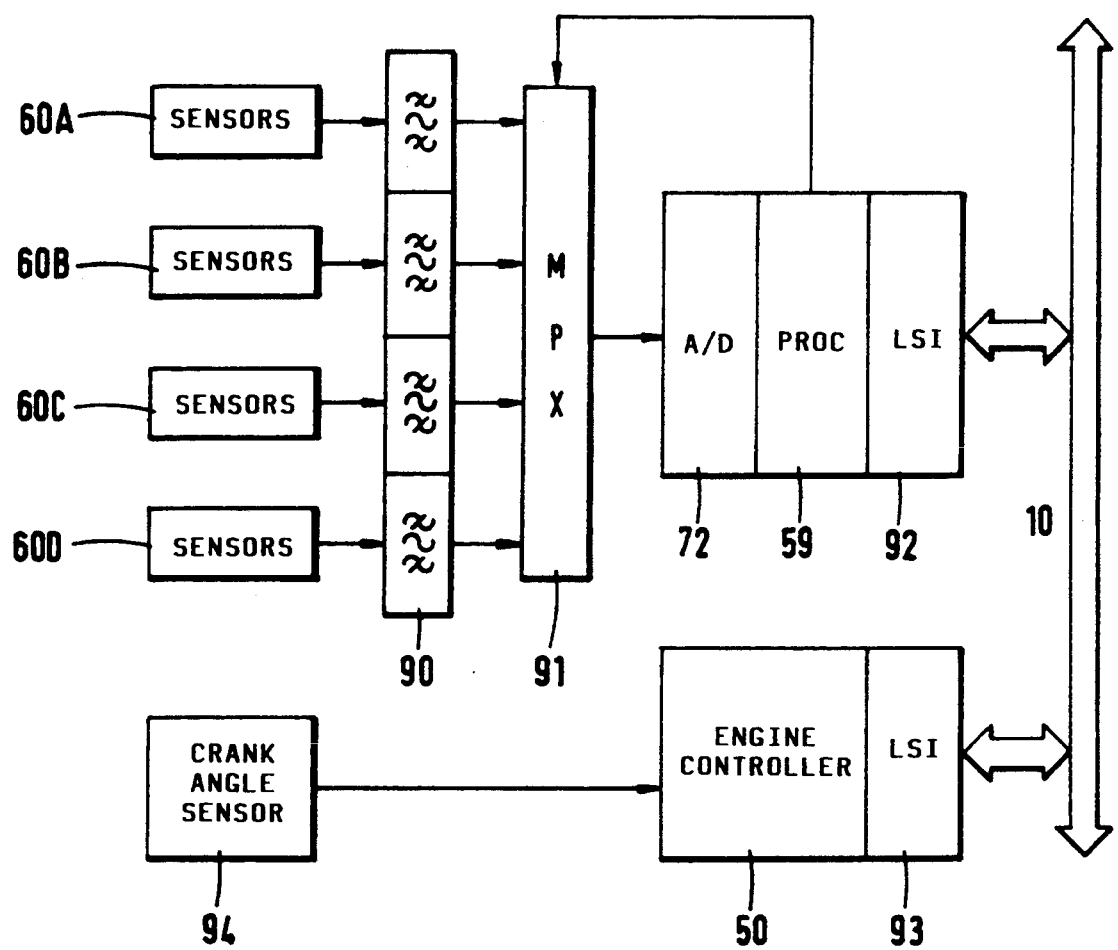
FIG. 45 is a detailed view of a knocking controlling device.

The knocking detection sensor illustrated in FIG. 45 is a sensor for a four-cylinder engine but the system is substantially the same irrespective of the number of the cylinders. A knocking sensor is disposed for each cylinder, as indicated by the reference numerals 60A, 60B, 60C and 60D. The detection signal of each knocking sensor is introduced to a multiplexer 91 through a respective band pass filter 90. The multiplexer 91 operates in accordance with the control signal of the knocking signal detecting controller 59, discriminates the signal of the knocking sensor for each cylinder time sequentially and outputs it to the A/D converter 72. The signal of the knocking sensor for each cylinder which is converted into a digital signal is supplied to the knocking signal processing controller 59, which judges knocking for each cylinder and supplies the judgment signal from an LSI 92 for serial transmission to the communication bus 10. A cylinder number judgment signal is supplied from a crank angle sensor 94 to the knocking signal processing controller 59 via the engine controller 50 and an LSI 93 for serial transmission to the communication bus 10. The knocking signal processing controller 59 links the number of the cylinder with the signals from the knocking sensors and judges knocking for each cylinder.

A knocking judgment signal is input from the communication bus 10 to the engine controller 50 through the LSI 93 for serial transmission and the ignition timing value is corrected for each cylinder on the basis of the knocking judgment signal, whereby the ignition timing is corrected and controlled independently for each cylinder.

The operation of the apparatus shown in FIG. 45 is represented in the time chart of FIG. 46. The wave form of the signal of the knocking sensor for each cylinder A, B, C, D is shaped by the band pass filter 90, as shown in FIG. 46(a) and is aligned as a signal in time series, as shown in FIG. 46(b). A part of the signal enlarged is shown in FIG. 46(c). The signal is amplitude sliced at level S/L in FIG. 46(d) thereby producing pulses as shown in FIG. 46(f) and the pulses are converted by A/D converter 72 into a digital signal at predetermined intervals (μs). The converted value is supplied to the knocking detecting processing controller 59, where the intensity of knocking is judged and outputted with the cylinder identification signal (shown in FIG. 46(e) to form the signal shown in FIG. 46(g) which is then applied.

Since knocking varies for each cycle it is preferable to transmit a somewhat processed knocking judgement signal, such as an averaged signal or other statistically processed signal, to the transmission bus 10, rather than to transmit it to the bus 10 without any processing for every cycle. More specifically, knocking judgment signals for several cycles or several ten cycles are temporarily stored in the knocking signal processing controller 59 for each cylinder and the final knocking judgment signal obtained from the collective result thereof is supplied to the communication bus.

Figure 47:
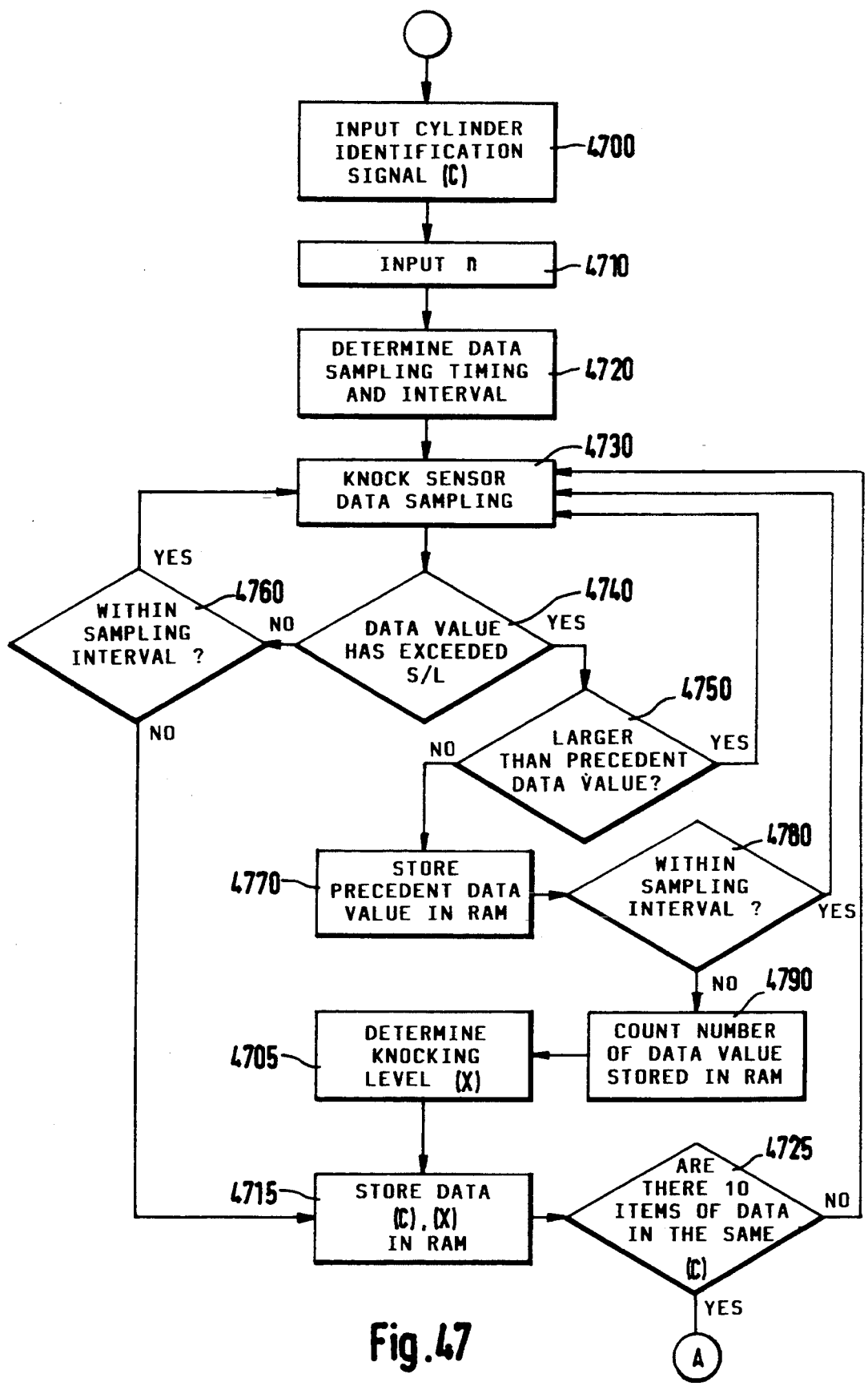
FIGS. 47 and 48 are flowcharts for the knocking sensors.

These operations are shown in a flowchart of FIG. 47. A cylinder identification signal (C) is first input at the step 4700, and the number n of revolutions of the engine is input at the step 4710. At the step 4720, the time and interval for data sampling are determined from these input (C) and n signals, and the signals from the knocking sensors are sampled at the step 4730. Whether or not the sampled data exceeds the predetermined slice level S/L (shown in FIG. 46(d)) is judged at the step 4740. If the answer is yes, the process proceeds to the step 4750. If the answer is not, the process proceeds to the step 4760. At the step 4750, judgment is made as to whether or not the data value is larger than the precedent data value, and if the answer is in the affirmative, the process is returned to the step 4730 to continue the data sampling. If the answer is in the negative, the process proceeds to the step 4770 and the precedent data value is stored in a RAM. At the step 4780, judgment is made as to whether or not the procedure is in the range of the sampling interval determined at the step 4720, and if the answer is yes, the process is returned to the step 4730 for further data sampling. On the other hand, if the sampling interval set at the step 4720 has passed, the process proceeds to the step 4790, and the data values and numbers stored in the RAW at the step 4770 are calculated. At the step 4705, the level (X) of the knocking is determined.

Figure 48:
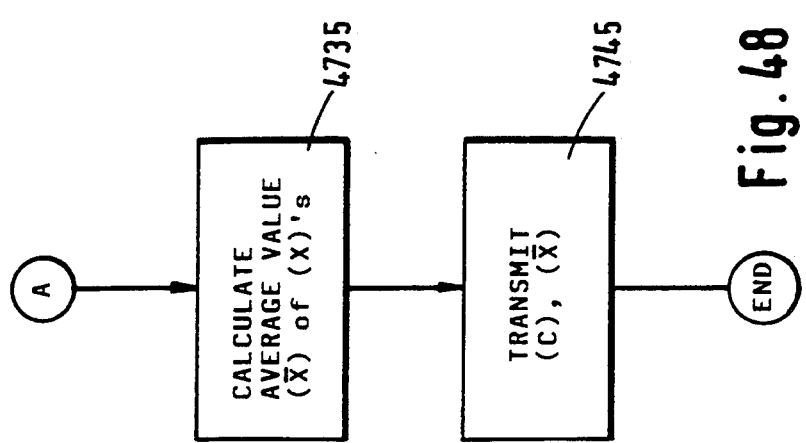

On the other hand, if the value of sampled data is judged not to exceed the slice level S/L at the step 4740, the process proceeds to the step 4760 and judgment is made as to whether or not the procedure is in the range of the sampling interval determined at the step 4720. If the answer is yes, the process is returned to the step 4730 for further data sampling. On the other hand, if the sampling interval has passed, the process proceeds to the step 4715. At the step 4715, the cylinder identification signal (C) and the knocking level (X) input at the step 4700 are temporarily stored in the RAM. At the step 4725, whether or not 10 (X) levels for the same cylinder (C) have been measured, is judged. If the number of (X) levels is less than 10, the process is returned to the step 4730. If the number of (X) levels has reached 10, the process proceeds to the step 4735 shown in FIG. 48 to calculate the average value (X) of the (X) levels. That is, the average level of the knocking for a particular cylinder during 10 explosion strokes is calculated. At the step 4745, the cylinder identification signal (C) of the corresponding cylinder and the average level (X) are transmitted to the communication bus 10 in one set.

The flow from the step 4700 to the step 4725 is carried out at each explosion stroke of each cylinder, and the flow from the step 4735 to the step 4745 is carried each time the data values of 10 (X) levels have been collected. After a signal is transmitted to the communication bus 10 at the step 4745, all the memories of the corresponding data values (X) in the RAM are deleted to wait for new data to be input. In the example shown in FIG. 47, the number of times for averaging the values is set at 10, but in order to construct a control system attaching great importance to high responsiveness, the number of times is reduced. On the other hand, if stress is laid on controlling the accuracy and the stability, the number of times is increased.

Figure 49:
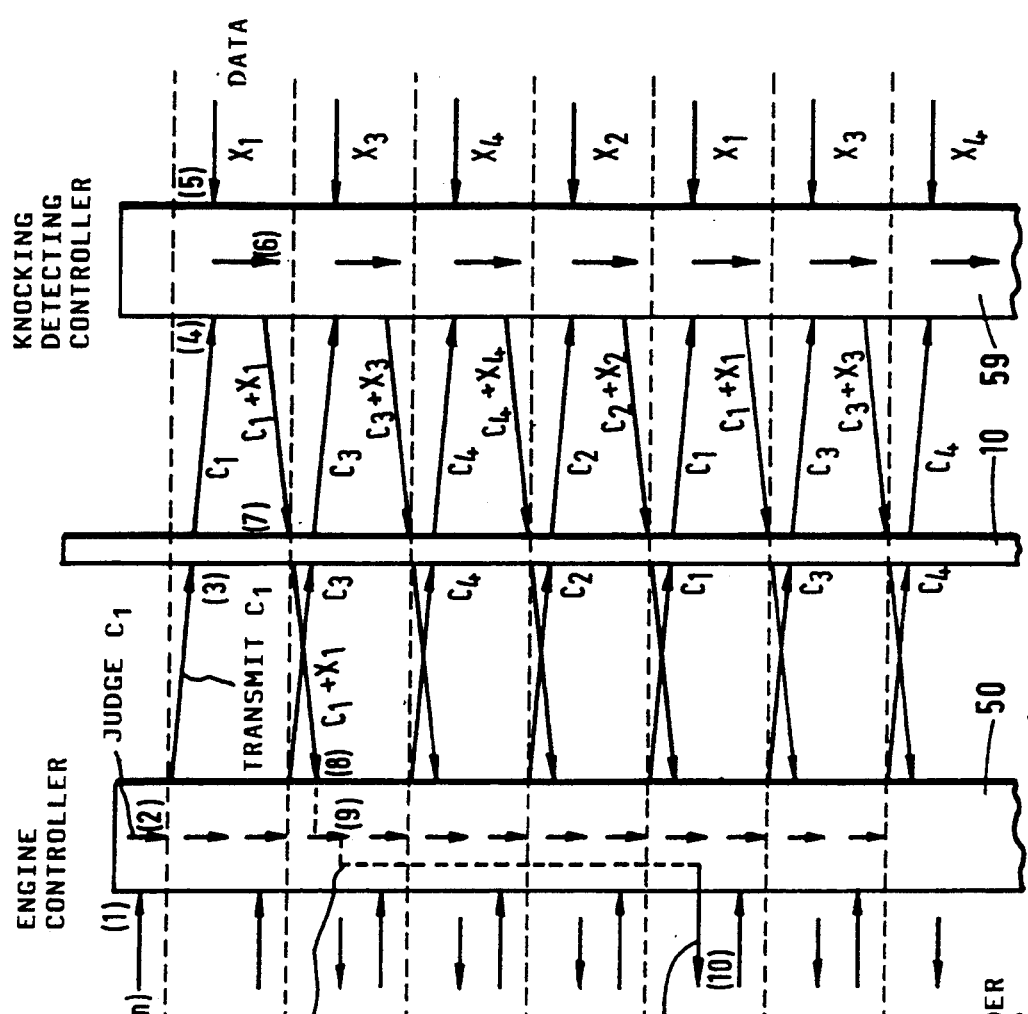
FIG. 49 shows the flow of data between the engine and knocking controllers.

FIG. 49 shows the time sequential flow of data. The number n of revolutions and the cylinder identification signal $C_1$ are first detected (1) by the engine controller 50. Thereafter, the number of the current cylinder is judged (2). $C_1$ represents that the cylinder is the cylinder 1. The signal $C_1$ is then transmitted (3) to the communication bus 10. The knocking detecting controller 59 receives (4) $C_1$ and receives (5) a knocking signal at a predetermined time. The level of the knocking is next judged (6). The judged level is assumed here to be $X_1$. The knocking detecting controller 59 adds the knocking level signal $X_1$ to the cylinder identification signal $C_1$, and they are transmitted (7) to the communication bus 10 as one item of data. The engine controller 50 receives (8) the data $C_1+X_1$. The engine controller 50 determines (9) the amount of fuel to be supplied (time for opening the injection valve) and the ignition timing. The values determined here are retained for use until the next power stroke for the particular cylinder being considered. When the time arrives for the next power stroke for the particular cylinder, the fuel is supplied and the cylinder is ignited (10) on the basis of the retained data. The same operations are repeated for the other cylinders.

In this example, the engine controller 50 and the knocking detecting controller 59 cooperate with each other for the same object/purpose of knocking control.

Since knocking processing is required at the time of high-speed engine rotation, so it is necessary to provide the knocking detecting controller exclusively for that purpose, as in the above described embodiment.

A diagnostic controller will now be described.

Figure 50:
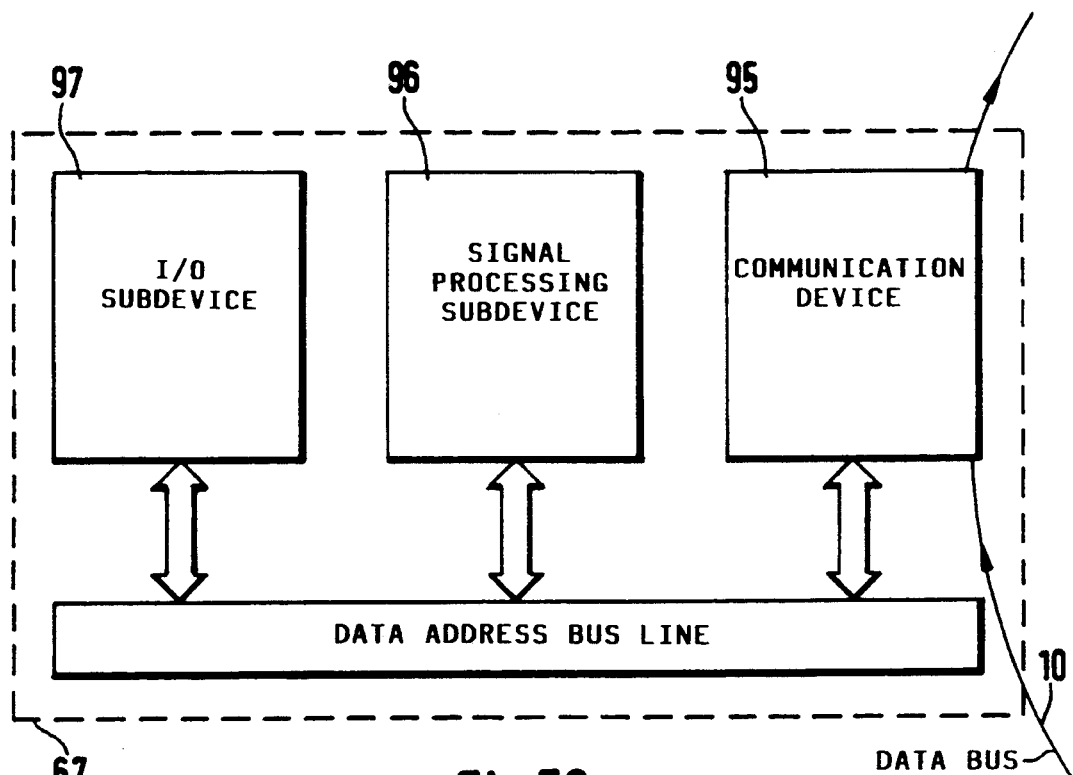
FIG. 50 schematically shows a diagnostic device.

FIG. 50 shows a block diagram of a diagnostic controller. The diagnostic controller 67 has a communication device 95 for receiving and transmitting the data on the communication bus 10, a signal processing subdevice 96 for executing the signal processing of the data and an I/O subdevice 97 for receiving an external signal (analog, digital). The signal processing subdevice 96 is, for example, a microcomputer.

Figure 51:
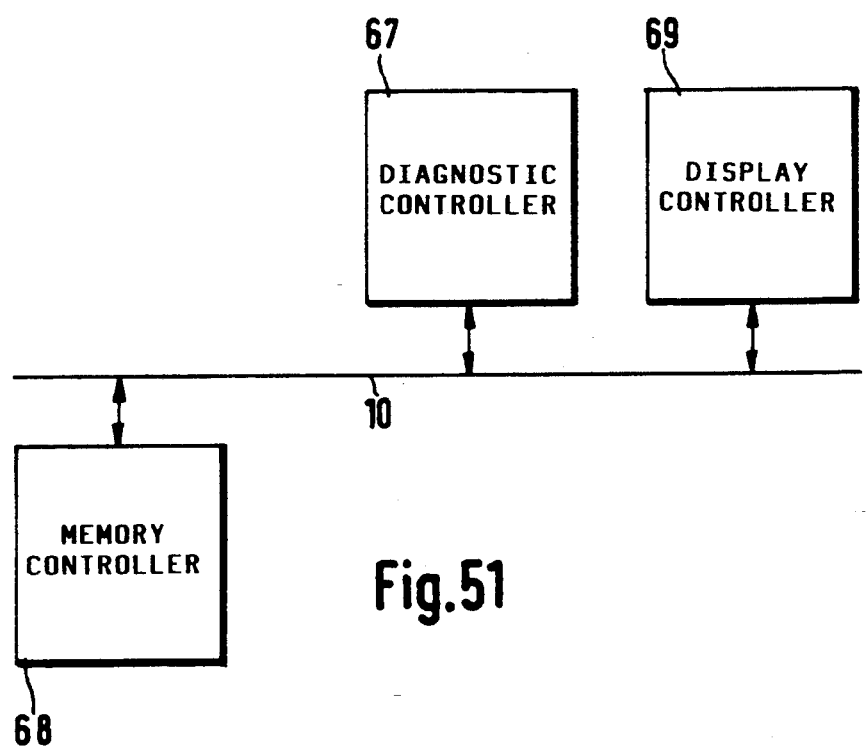
FIG. 51 shows the connection between the diagnostic and display computers.

FIG. 51 shows the structure of the diagnostic controller system with the controller 67 shown in FIG. 50 provided therein. In this system, the diagnostic controller 67, a display controller 69 and a memory controller 68 are connected with each other through the communication bus 10. The display controller 69 and/or the memory controller 68 is also provided with the signal processing subdevice 96 therein, as shown in FIG. 50.

Figure 52:
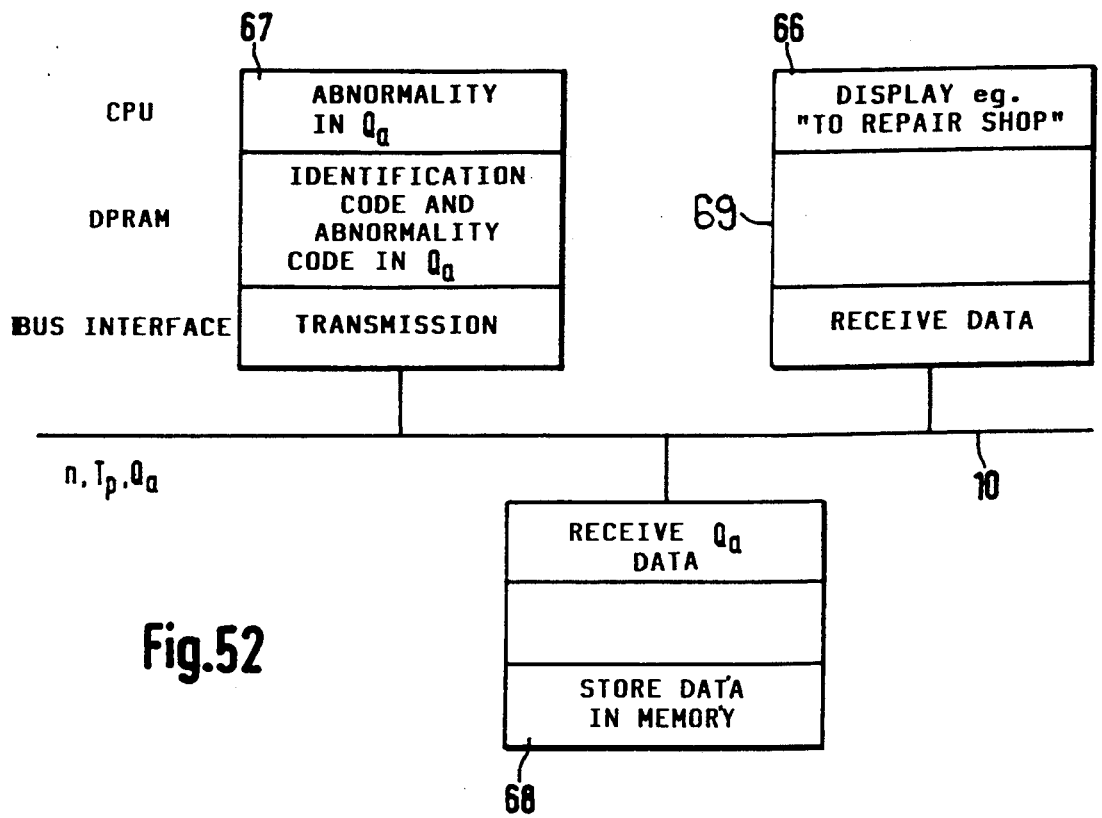
FIG. 52 shows the apparatus used in the diagnostic device of FIG. 50.

FIG. 52 shows an example of signal processing. It is assumed that the signals of the number n of engine revolutions, the injection pulse width $T_p$ and the amount $Q_a$ of air are supplied. If, for example, the diagnostic controller 67 judges the signal $Q_a$ to be abnormal, an abnormal code is added to the data $Q_a$ before it is transmitted. The memory controller 68 receives the data $Q_a$ and if the abnormal code is added thereto, the identification code is stored in the memory. In addition, the number of times of receiving abnormal data is stored in the memory. When the number of times of reception exceeds a predetermined number of times stored in the memory of the memory controller 68, the display code is added to the data. The display controller 69 (shown in FIG. 13) which has received the data and display code, provides output data over bus 10 to display 66 which provides a visual display on the basis of the output data.

Figure 53:
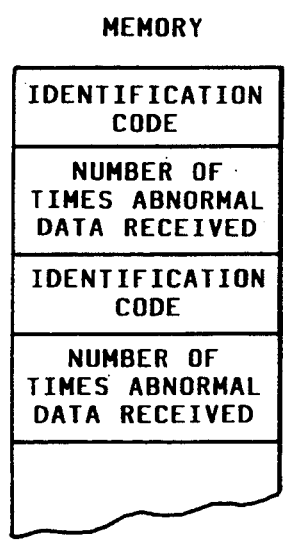
FIG. 53 shows the contents of the memory used in FIG. 52.

FIG. 53 shows an example of the structure of the memory controller memory. The identification code for the data and the number of times of receiving abnormal data are stored in different parts of the memory for the respective codes.

FIG. 54 shows an example of a flowchart of the diagnostic controller. At the step 5400, data and the identification code are read, and at the steps 5410 and 5420, signals are judged. For example, if the signal $Q_a$ is 0 V (step 5410) or not less than 5 V (step 5420), it is judged to be abnormal, and an abnormal code is added to the signal $Q_a$ at the step 5430. At the step 5440, the signal is transmitted to the communication bus ( step 5440 ). If no abnormality is found, the signal $Q_a$ is supplied as it is to the communication bus as the data.

Figure 55:
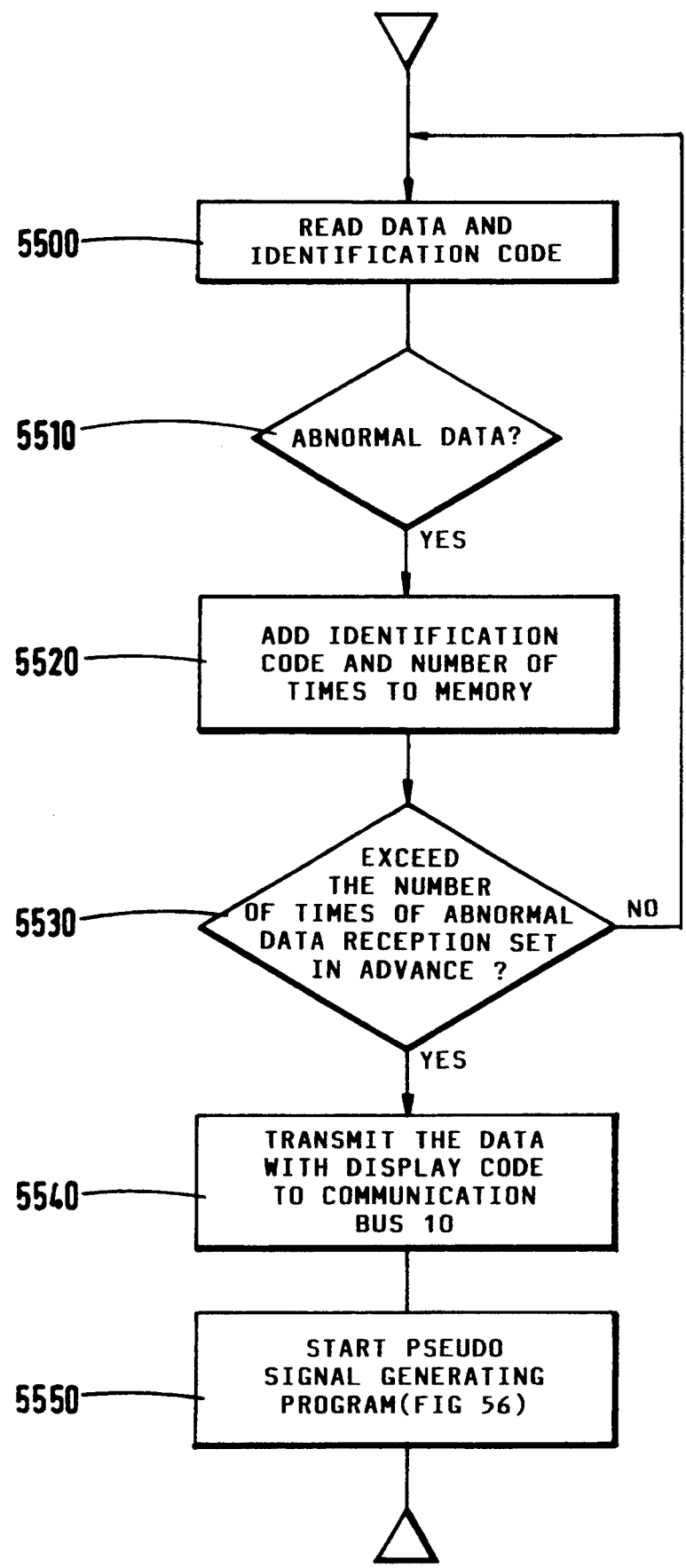

FIG. 55 is a flowchart of the memory controller. At the step 5500, a data identification code and the data are read. If the data is judged to be abnormal at the step 5510, the identification code and the number of times are added to the memory at the step 5520. If the number of times exceeds the predetermined number of times which has been determined in advance for each identification code (and each kind of data) at the step 5530, the display code is added to the data before it is transmitted to the communication bus 10 (step 5540). Thereafter, at the step 5550, a pseudo signal generation program is started. This program is required to enable the vehicle to continue to operate until the fault can be rectified.

FIG. 56 shows a pseudo signal generation program. This is a program for separating the location at which a serious error (e.g. trouble in the sensor or broken connection) is judged to have been caused by the statistical processing of errors from the control routine and generating a pseudo signal at the same time as the task processing timing for the location at which the error has been caused. In this way, a self-reliance run is enabled to a certain extent.

Figure 58:
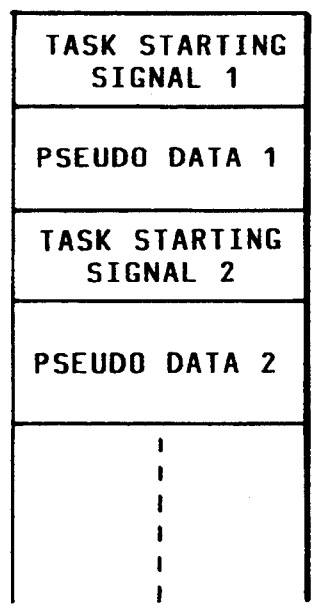
FIG. 58 shows the contents of the memory producing pseudo data.

When this program is started, as shown in FIG. 56, a command for not generating a signal at the location at which the serious error has been caused is output at the step 5600. At the step 5610, the task processing timing for the signal is read from the memory corresponding to the location and is stored in the task scheduler of the memory controller 68. Thereafter, as shown in FIG. 57, every time the program is started at the timing, the pseudo data in the memory corresponding to the location for the error is read at the step 5700, and it is transmitted to the communication bus 10 at the step 5710. The configuration in which the pseudo data is stored is shown in FIG. 58. The pseudo data for the locations which are serious for driving the vehicle are stored in the controller 68 together with the task starting signal.

Figure 59:
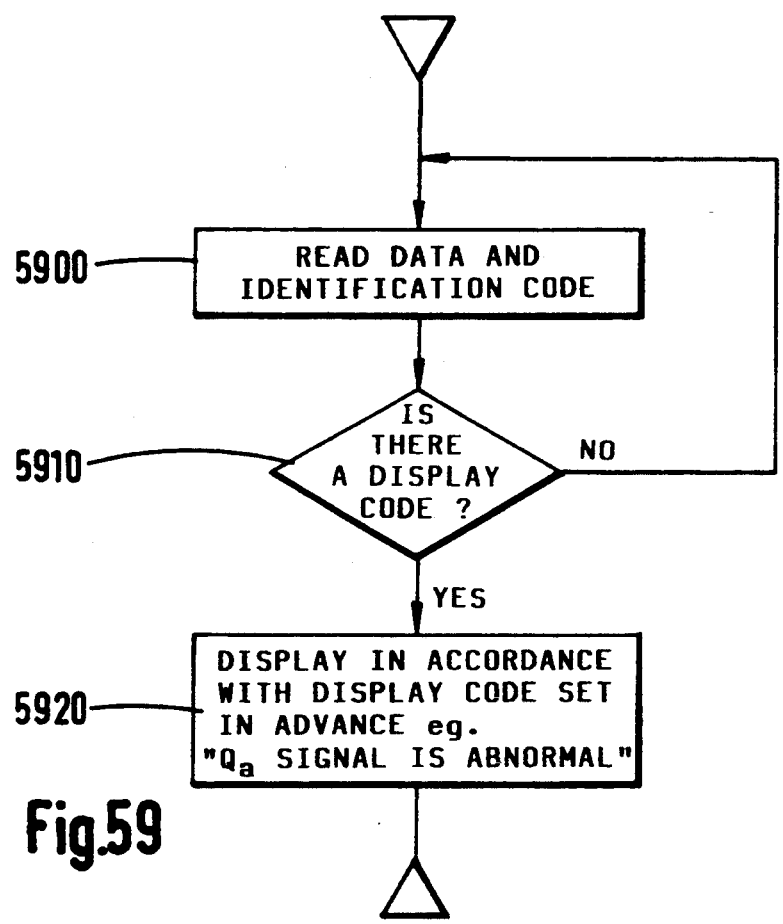
FIG. 59 is a flowchart of display.

FIG. 59 is a flowchart of display. At the step 5900, a data identification code and the data are read and at the step 5910, the presence or absence of the display code is checked. At the step 5920, the data is displayed on the display on the basis of the display code.

In the above-described system, it is possible to synthetically judge the main cause of trouble by the built-in controller on the basis of the identification code and the abnormal data stored in the memory.

The signal $Q_a$ is used as an example at step 5920, but the invention may be applied to the number of revolutions of the engine n, the water temperature in the radiator, the electrolyte level of the battery, the battery voltage, the injection pulse width, the air fuel ratio, etc.

FIG. 60 shows the time sequential flow of data. The diagnostic controller 67 receives (1) various kinds of data and judges (2) whether or not the data is abnormal. Abnormal data is supplied (3) with abnormal signals added thereto. The memory controller 68 receives (4) abnormal data and statistically processes (5) it. As a result, seriously abnormal data is transferred (6, 7) to the display controller 69. The display controller 69 displays (8) the fault. On the other hand, the memory controller 68 generates (9) a pseudo signal of the location at which a serious error has been generated.

In this example, the three controllers 67, 68 and 69 cooperate with each other in the detection of abnormality, statistical processing, display, and the generation of a pseudo signal.

It will be realised by those skilled in the art that the number of controllers used may be varied and the functions controlled may be altered from those described above in the exemplary embodiments.

Having now described the invention, it will be understood that since it is possible to assign the processing which is required to be executed at a high speed to a controller provided exclusively therefor separately from other controllers, the accuracy and increased speed of automotive control is realised.

Also, having thus described the invention with reference to specific embodiments, it is to be understood that changes may be made without departing from the spirit and scope of the present invention as defined by the appended claims.

We claim:

1. A vehicle control apparatus including:

first and second adjusting means for adjusting first and second controlled parameters of a vehicle, respectively;

first and second control means, connected to said first and second adjusting means, for controlling said first and second adjusting means, respectively;

a signal communication path interconnecting said first and second control means; and transferring means for transferring a signal representative of a condition to be controlled determined by said first control means to said second control means over said communication path, wherein said first control means executes a processing for calculating the first controlled parameter on the basis of data supplied, judges, on the basis of the thus calculated first controlled parameter, whether or not said second control means has to operate in cooperation with said first control means, and produces an output signal to said communication path, if the cooperative operation is required; and said second control means executes a processing for calculating the second controlled parameter in response to the output signal produced by said first control means, consequently said first and second adjusting means control the first and second controlled parameters associated therewith simultaneously in synchronism and in accordance with the processing results of the respective control means.

2. An apparatus as claimed in claim 1, wherein there is provided more than two adjusting means, each for adjusting a respective parameter of the vehicle and each adjusting means is controlled by a respective control means, in which all of said control means are interconnected to one another by said communication path, and said transferring means transfers data representative of a condition to be controlled determined by one of said control means to selected other said control means over said communication path, such that said one control means and all of said selected other control means control their respective adjusting means in unison.

3. An apparatus as claimed in claim 1 wherein means are provided for according a priority to signals passed over said communication path.

4. An apparatus as claimed in claim 1 wherein said adjusting means include at least one of a throttle actuator, a fuel injector, vehicle suspension damper means, vehicle suspension height setting means.

5. An apparatus as claimed in claim 1 wherein the control means includes an engine controller, a throttle controller and a suspension controller, said engine controller being connected to receive signals from an accelerator pedal angle sensor and a brake pedal angle sensor, said engine controller providing a signal indicative of one of the accelerator pedal angle and the brake pedal angle over the communication path to the throttle controller and synchronously to the suspension controller, said throttle controller controlling a throttle actuator and said suspension controller controlling the vehicle ride height and suspension damping force, said throttle controller and said suspension controller acting simultaneously with one another.

6. An apparatus as claimed in claim 5 wherein the suspension controller controls vehicle height actuators and damping force actuators whereby when the vehicle is accelerating the controller causes the front vehicle dampers to decrease their ride height, and rear vehicle dampers to increase their ride height and for the damping force actuator to stiffen, and when braking is detected by the suspension controller, said suspension controller causes the front vehicle dampers to increase their ride height and the rear vehicle dampers to decrease their ride height, and the damping force actuator to stiffen.

7. An apparatus as claimed in claim 1 wherein the control means includes an engine controller, a torque detecting controller and a transmission controller, said engine controller is connected to a means for determining a cylinder causing a power stroke and said engine controller outputs a signal indicative of said cylinder causing a power stroke to said torque controller, said torque controller is connected to engine crankshaft torque sensors and evaluates the engine torque, and transmits a signal representative thereof over said communication path to said transmission controller and to said engine controller, whereupon said engine controller compares the evaluated torque signal with predetermined torque values to thereby calculate the required amount of throttle opening and simultaneously therewith the transmission controller determines an appropriate gear ratio in dependence upon the evaluated torque signal from the torque controller.

8. An apparatus as claimed in claim 1 wherein the control means include an engine controller and a knock detecting controller, the engine controller being connected to a sensing means for sensing a cylinder causing a power stroke and to an actuator means for controlling fuel injection pulse width and ignition timing, said knock detecting controller being connected to a knock sensor, said engine controller determining a cylinder causing a power stroke and transmitting a signal indicative thereof over said communication path to the knock detecting controller, said knock detecting controller detecting the level of knocking from the knock sensor and transmitting a signal representative thereof in combination with a cylinder identification signal over said communication path to the engine controller, whereby said engine controller calculates the fuel injector pulse width and the ignition timing for said actuator means.

9. An apparatus as claimed in claim 1 wherein the control means include a diagnostic controller connected to a plurality of sensors indicative of respective operating states of said vehicle, a memory controller for holding predetermined data values, and a display controller for controlling a display, the controllers being interconnected over said communication path, whereby said diagnostic controller is connected to receive data over said communication path from said sensors and to detect an abnormality, said abnormality subsequently being transmitted over said communication path to said memory controller, said memory controller statistically evaluating received data and transmitting a signal over said communication path to the display controller for driving said display, and said memory controller produces a pseudo signal to facilitate continued operation of the vehicle in the event that a serious abnormality is detected.

10. An apparatus as claimed in claim 9 wherein said memory controller is arranged to output a signal to the display controller and produce the pseudo signal only when abnormal data has been received in excess of a predetermined number of times.

11. An apparatus as claimed in claim 1, in which:
there is further provided third control means, which controls third adjusting means for adjusting a third controlled parameter;
said third control means reads therein operational parameters of the vehicle and outputs an output signal representative of a result of a predetermined processing to said communication path;
said first control means executes a processing for determining the first controlled parameter on the basis of the processing result of said third control means to thereby produce an output to said first adjusting means, as well as to judge on the basis of the thus determined first controlled parameter whether or not said second control means has to operate in cooperation with said first control means and to produce an output signal to said communication path, if the cooperative operation is required;
said second control means executes a processing for determining the second controlled parameter on the basis of the output signal of said first control means to produce an output signal to said second adjusting means,
and said first and second adjusting means adjust the first and second controlled parameters simultaneously and in accordance with the processing results of the respective control means.

12. An apparatus as claimed in claim 11, in which:
said third control means is an engine controller, which takes therein signals indicative of air quantity and engine speed, calculates engine torque and transmits the calculated engine torque as the output signal thereof to said communication path;
said first control means is a transmission controller, which evaluates an adaptive gear ratio on the basis of the engine torque taken therein from said communication path, judges whether or not a gear shift is required, and, if the gear shift is required, produces the output signal thereof to said communication path, as well as effects the gear shift; and
said second control means is a throttle controller, which is actuated in response to the output signal of said first control means taken therein from said communication path and open a throttle at a required angle.

13. An apparatus as claimed in claim 1 wherein the signal communication path is a data highway and said control means are microprocessors.

14. A vehicle control apparatus including:
first and second detecting means for detecting first and second parameters of the operation of a vehicle;
first and second processing means for executing predetermined processing operations to output signals for controlling the first and second parameters, respectively;
adjusting means for adjusting the first and second parameters in accordance with the output signals of said first and second processing means;
a communication path interconnecting said first and second detecting means, said first and second processing means and said adjusting means; and
means for transferring a condition to be controlled over said communication path from said first processing means to said second processing means, wherein said first processing means executes a predetermined processing on the basis of data supplied, judges on the basis of a result of the processing whether or not said second processing means has to operate in cooperation with said first processing means, and produces an output signal to said communication path, if the cooperation is required;

said second processing means executes a predetermined processing on the basis of the output signal produced by said first processing means, and consequently said first and second processing means operate in synchronism with one another to control said adjusting means so that the first and second parameters are adjusted simultaneously and in cooperation with one another.

15. A vehicle control apparatus, comprising:

a plurality of adjusting means for adjusting plural controlled parameters of a vehicle, respectively;

a plurality of controlling means for controlling corresponding ones of said plurality of adjusting means, each of said controlling means having an input/output circuit and a communication device for transmitting and receiving data associated with a predetermined processing operation in said plurality of controlling means; and a communication path interconnecting the communication device of each of said plural controlling means, wherein when one of the controlled parameters is changed, a certain one of said controlling means, which is associated with the controlled parameter to be changed, receives data through the input/output circuit and the communication device, executes the predetermined processing operation on the basis of the received data, and outputs processed results to related ones of said controlling means through said communication path, as well as the associated adjusting means;

and further wherein said certain one controlling means further judges on the basis of a result of its own processing whether or not said related controlling means are necessary to operate in cooperation with said certain one controlling means, and produces an output signal to said communication path, if the cooperation is required;

said related controlling means execute predetermined processing operations in response to the output signal produced by said certain one controlling means, and consequently said certain one controlling means and said related controlling means operate in synchronism with one another and attain the respective controlled parameters to be changed simultaneously.

16. A vehicle control apparatus including:

first and second adjusting means for adjusting first and second controlled parameters of a vehicle, respectively;

first and second control means, connected to said first and second adjusting means, for controlling said first and second adjusting means, respectively;

a signal communication path interconnecting said first and second control means; and transferring means for transferring a signal from said first control means to said second control means over said communication path, said signal being determined by said first control means and being representative of a condition to be controlled;

wherein said first control means executes a processing for calculating the first controlled parameter on the basis of data supplied, judges, on the basis of the thus calculated first controlled parameter, whether or not said second control means has to operate in cooperation with said first control means, and produces, if the cooperative operation is required, an output signal including an instruction indicative of a cooperative request to said communication path; and said second control means executes a processing operation for calculating the second controlled parameter in response to the output signal including the instruction indicative of the cooperative request produced by said first control means; and further wherein said first and second adjusting means control the first and second controlled parameters associated therewith simultaneously in synchronism and in accordance with the processing results of the respective control means.

* * * * *